US011885755B2

(12) United States Patent
Yun et al.

(10) Patent No.: US 11,885,755 B2
(45) Date of Patent: Jan. 30, 2024

(54) X-RAY SEQUENTIAL ARRAY WAVELENGTH DISPERSIVE SPECTROMETER

(71) Applicant: Sigray, Inc., Concord, CA (US)

(72) Inventors: Wenbing Yun, Walnut Creek, CA (US); Ruimin Qiao, Berkeley, CA (US); Sylvia Jia Yun Lewis, San Francisco, CA (US); Srivatsan Seshadri, Pleasanton, CA (US); Janos Kirz, Berkeley, CA (US); Benjamin Donald Stripe, Berkeley, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 18/309,021

(22) Filed: Apr. 28, 2023

(65) Prior Publication Data

US 2023/0349842 A1    Nov. 2, 2023

Related U.S. Application Data

(60) Provisional application No. 63/337,407, filed on May 2, 2022.

(51) Int. Cl.
*G01N 23/207* (2018.01)
*G01N 23/20008* (2018.01)
(Continued)

(52) U.S. Cl.
CPC ....... *G01N 23/2076* (2013.01); *G01N 23/085* (2018.02); *G01N 23/20008* (2013.01);
(Continued)

(58) Field of Classification Search
None
See application file for complete search history.

(56) References Cited

U.S. PATENT DOCUMENTS 3,102,196 A * 8/1963 Ladell ................. G01N 23/223
378/49
4,169,228 A 9/1979 Briska et al.
(Continued)

FOREIGN PATENT DOCUMENTS

CN    1656373 A    8/2005
CN    1829910 A    9/2006
(Continued)

OTHER PUBLICATIONS

"High performance benchtop EDXRF spectrometer with Windows®®® software," published by: Rigaku Corp., Tokyo, Japan; 2017.
(Continued)

*Primary Examiner* — Thomas R Artman
(74) *Attorney, Agent, or Firm* — Knobbe, Martens, Olson & Bear, LLP

(57) ABSTRACT

An apparatus is configured to receive x-rays propagating from an x-ray source. The apparatus includes first and second x-ray diffractors, the second x-ray diffractor downstream from the first x-ray diffractor and first and second x-ray detectors. The first x-ray diffractor is configured to receive the x-rays, to diffract a first spectral band of the x-rays to the first x-ray detector, and to transmit at least 2% of the received x-rays to the second x-ray diffractor. The second x-ray diffractor is configured to receive the transmitted x-rays from the first x-ray diffractor and to diffract a second spectral band of the x-rays to the second x-ray detector. The first x-ray detector is configured to measure a first spectrum of the first spectral band of the x-rays and the second x-ray detector is configured to measure a second spectrum of the second spectral band of the x-rays.

31 Claims, 7 Drawing Sheets

(51) Int. Cl.
  *G01N 23/085* (2018.01)
  *G01N 23/2209* (2018.01)
(52) U.S. Cl.
  CPC ... *G01N 23/2209* (2018.02); *G01N 2223/041* (2013.01); *G01N 2223/0568* (2013.01); *G01N 2223/076* (2013.01); *G01N 2223/1016* (2013.01); *G01N 2223/316* (2013.01); *G01N 2223/32* (2013.01); *G01N 2223/50* (2013.01); *G01N 2223/652* (2013.01)

(56) References Cited

U.S. PATENT DOCUMENTS

| | | | |
|---|---|---|---|
| 4,642,811 A | 2/1987 | Georgopoulos | |
| 4,852,135 A * | 7/1989 | Anisovich | G01N 23/223 378/45 |
| 4,945,552 A | 7/1990 | Ueda | |
| 5,132,997 A | 7/1992 | Kojima | |
| 5,173,928 A | 12/1992 | Momose et al. | |
| 5,204,887 A | 4/1993 | Hayashida et al. | |
| 5,220,591 A | 6/1993 | Ohsugi et al. | |
| 5,249,216 A | 9/1993 | Ohsugi et al. | |
| 5,280,176 A | 1/1994 | Jach et al. | |
| 5,406,608 A * | 4/1995 | Yellepeddi | G01N 23/2206 378/45 |
| 5,684,857 A | 11/1997 | De Bokx | |
| 5,778,039 A | 7/1998 | Hossain | |
| 5,812,629 A | 9/1998 | Clauser | |
| 5,832,052 A | 11/1998 | Hirose et al. | |
| 5,912,940 A | 6/1999 | O'Hara | |
| 6,108,398 A | 8/2000 | Mazor et al. | |
| 6,181,773 B1 | 1/2001 | Lee et al. | |
| 6,195,410 B1 | 2/2001 | Cash, Jr. | |
| 6,226,347 B1 | 5/2001 | Golenhofen | |
| 6,381,303 B1 | 4/2002 | Vu et al. | |
| 6,430,254 B2 | 8/2002 | Wilkins | |
| 6,442,231 B1 | 8/2002 | O'Hara | |
| 6,456,688 B1 | 9/2002 | Taguchi et al. | |
| 6,504,902 B2 | 1/2003 | Iwasaki et al. | |
| 6,512,814 B2 | 1/2003 | Yokhin et al. | |
| 6,577,704 B1 | 6/2003 | Holz | |
| 6,611,577 B1 | 8/2003 | Yamagami | |
| 6,639,968 B2 | 10/2003 | Yokhin et al. | |
| 6,711,234 B1 | 3/2004 | Loxley et al. | |
| 6,763,086 B2 | 7/2004 | Platonov | |
| 6,829,327 B1 | 12/2004 | Chen | |
| 6,895,071 B2 | 5/2005 | Yokhin et al. | |
| 6,914,723 B2 | 7/2005 | Yun et al. | |
| 6,917,472 B1 | 7/2005 | Yun et al. | |
| 6,934,359 B2 | 8/2005 | Chen | |
| 7,006,596 B1 | 2/2006 | Janik | |
| 7,023,955 B2 | 4/2006 | Chen et al. | |
| 7,095,822 B1 | 8/2006 | Yun | |
| 7,119,953 B2 | 10/2006 | Yun et al. | |
| 7,120,228 B2 | 10/2006 | Yokhin et al. | |
| 7,180,979 B2 | 2/2007 | Momose | |
| 7,183,547 B2 | 2/2007 | Yun et al. | |
| 7,187,751 B2 | 3/2007 | Kawahara et al. | |
| 7,215,736 B1 | 5/2007 | Wang et al. | |
| 7,218,703 B2 | 5/2007 | Yada et al. | |
| 7,221,731 B2 | 5/2007 | Yada et al. | |
| 7,245,696 B2 | 7/2007 | Yun et al. | |
| 7,258,485 B2 | 8/2007 | Nakano et al. | |
| 7,268,945 B2 | 9/2007 | Yun et al. | |
| 7,388,942 B2 | 6/2008 | Wang et al. | |
| 7,394,890 B1 | 7/2008 | Wang et al. | |
| 7,400,704 B1 | 7/2008 | Yun et al. | |
| 7,406,151 B1 | 7/2008 | Yun | |
| 7,414,787 B2 | 8/2008 | Yun et al. | |
| 7,453,560 B2 | 11/2008 | Miyake | |
| 7,463,712 B2 | 12/2008 | Zhu et al. | |
| 7,486,770 B2 | 2/2009 | Baumann | |
| 7,492,871 B2 | 2/2009 | Popescu | |
| 7,499,521 B2 | 3/2009 | Wang et al. | |
| 7,515,684 B2 | 4/2009 | Gibson et al. | |
| 7,519,153 B1 * | 4/2009 | Moore | H01J 37/244 378/85 |
| 7,522,698 B2 | 4/2009 | Popescu | |
| 7,522,708 B2 | 4/2009 | Heismann | |
| 7,532,704 B2 | 5/2009 | Hempel | |
| 7,551,719 B2 | 6/2009 | Yokhin et al. | |
| 7,551,722 B2 | 6/2009 | Ohshima et al. | |
| 7,561,662 B2 | 7/2009 | Wang et al. | |
| 7,564,941 B2 | 7/2009 | Baumann | |
| 7,639,786 B2 | 12/2009 | Baumann | |
| 7,646,843 B2 | 1/2010 | Popescu et al. | |
| 7,653,177 B2 | 1/2010 | Baumann et al. | |
| 7,680,243 B2 | 3/2010 | Yokhin et al. | |
| 7,787,588 B1 | 8/2010 | Yun et al. | |
| 7,796,725 B1 | 9/2010 | Yun et al. | |
| 7,796,726 B1 | 9/2010 | Gendreau et al. | |
| 7,809,113 B2 | 10/2010 | Aoki et al. | |
| 7,813,475 B1 | 10/2010 | Wu et al. | |
| 7,817,777 B2 | 10/2010 | Baumann et al. | |
| 7,848,483 B2 | 12/2010 | Platonov | |
| 7,864,922 B2 | 1/2011 | Kawabe | |
| 7,889,838 B2 | 2/2011 | David et al. | |
| 7,899,154 B2 | 3/2011 | Chen et al. | |
| 7,920,676 B2 | 4/2011 | Yun et al. | |
| 7,924,973 B2 | 4/2011 | Kottler et al. | |
| 7,945,018 B2 | 5/2011 | Heismann | |
| 7,949,092 B2 | 5/2011 | Brons | |
| 7,949,095 B2 | 5/2011 | Ning | |
| 7,974,379 B1 | 7/2011 | Case et al. | |
| 7,983,381 B2 | 7/2011 | David et al. | |
| 7,983,386 B2 * | 7/2011 | Yellepeddi | G01N 23/223 378/70 |
| 8,005,185 B2 | 8/2011 | Popescu | |
| 8,009,796 B2 | 8/2011 | Popescu | |
| 8,009,797 B2 | 8/2011 | Ouchi | |
| 8,041,004 B2 | 10/2011 | David | |
| 8,058,621 B2 | 11/2011 | Kommareddy | |
| 8,068,579 B1 | 11/2011 | Yun et al. | |
| 8,073,099 B2 | 12/2011 | Niu et al. | |
| 8,139,711 B2 | 3/2012 | Takahashi | |
| 8,165,270 B2 | 4/2012 | David et al. | |
| 8,184,771 B2 | 5/2012 | Murakoshi | |
| 8,233,587 B2 | 7/2012 | Sato | |
| 8,243,879 B2 | 8/2012 | Itoh et al. | |
| 8,306,183 B2 | 11/2012 | Koehler | |
| 8,351,570 B2 | 1/2013 | Nakamura | |
| 8,353,628 B1 | 1/2013 | Yun et al. | |
| 8,374,309 B2 | 2/2013 | Donath | |
| 8,451,975 B2 | 5/2013 | Tada | |
| 8,513,603 B1 | 8/2013 | Lederman et al. | |
| 8,559,594 B2 | 10/2013 | Ouchi | |
| 8,559,597 B2 | 10/2013 | Chen et al. | |
| 8,565,371 B2 | 10/2013 | Bredno | |
| 8,591,108 B2 | 11/2013 | Tada | |
| 8,602,648 B1 | 12/2013 | Jacobsen et al. | |
| 8,632,247 B2 | 1/2014 | Ishii | |
| 8,755,487 B2 | 6/2014 | Kaneko | |
| 8,767,915 B2 | 7/2014 | Stutman | |
| 8,767,916 B2 | 7/2014 | Hashimoto | |
| 8,781,069 B2 | 7/2014 | Murakoshi | |
| 8,824,629 B2 | 9/2014 | Ishii | |
| 8,855,265 B2 | 10/2014 | Engel | |
| 8,859,977 B2 | 10/2014 | Kondoh | |
| 8,908,824 B2 | 12/2014 | Kondoh | |
| 8,972,191 B2 | 3/2015 | Stampanoni et al. | |
| 8,989,474 B2 | 3/2015 | Kido et al. | |
| 9,001,967 B2 | 4/2015 | Baturin | |
| 9,016,943 B2 | 4/2015 | Jacobsen et al. | |
| 9,025,725 B2 | 5/2015 | Kiyohara et al. | |
| 9,031,187 B2 * | 5/2015 | Yellepeddi | G01N 23/223 378/81 |
| 9,031,201 B2 | 5/2015 | Sato | |
| 9,036,773 B2 | 5/2015 | David et al. | |
| 9,063,055 B2 | 6/2015 | Ouchi | |
| 9,086,536 B2 | 7/2015 | Pang et al. | |
| 9,129,715 B2 | 9/2015 | Adler et al. | |
| 9,222,899 B2 | 12/2015 | Yamaguchi | |
| 9,230,703 B2 | 1/2016 | Mohr et al. | |
| 9,234,856 B2 | 1/2016 | Mukaide | |

(56) References Cited

U.S. PATENT DOCUMENTS

| | | | |
|---|---|---|---|
| 9,291,578 B2 | 3/2016 | Adler | |
| 9,329,141 B2 | 5/2016 | Stutman | |
| 9,357,975 B2 | 6/2016 | Baturin | |
| 9,439,613 B2 | 9/2016 | Stutman | |
| 9,448,190 B2 | 9/2016 | Yun et al. | |
| 9,453,803 B2 | 9/2016 | Radicke | |
| 9,480,447 B2 | 11/2016 | Mohr et al. | |
| 9,486,175 B2 | 11/2016 | Fredenberg et al. | |
| 9,494,534 B2 | 11/2016 | Baturin | |
| 9,532,760 B2 | 1/2017 | Anton et al. | |
| 9,551,677 B2 | 1/2017 | Mazor et al. | |
| 9,557,280 B2 | 1/2017 | Pfeiffer et al. | |
| 9,570,265 B1 | 2/2017 | Yun et al. | |
| 9,588,066 B2 | 3/2017 | Pois et al. | |
| 9,594,036 B2 | 3/2017 | Yun et al. | |
| 9,632,040 B2 | 4/2017 | Stutman | |
| 9,700,267 B2 | 7/2017 | Baturin et al. | |
| 9,719,947 B2 | 8/2017 | Yun et al. | |
| 9,748,012 B2 | 8/2017 | Yokoyama | |
| 9,757,081 B2 | 9/2017 | Proksa | |
| 9,761,021 B2 | 9/2017 | Koehler | |
| 9,770,215 B2 | 9/2017 | Souchay et al. | |
| 9,778,213 B2 | 10/2017 | Bakeman et al. | |
| 9,823,203 B2 | 11/2017 | Yun et al. | |
| 9,826,949 B2 | 11/2017 | Ning | |
| 9,861,330 B2 | 1/2018 | Rossl | |
| 9,874,531 B2 | 1/2018 | Yun et al. | |
| 9,881,710 B2 | 1/2018 | Roessl | |
| 9,916,655 B2 | 3/2018 | Sampanoni | |
| 10,028,716 B2 | 7/2018 | Rossl | |
| 10,045,753 B2 | 8/2018 | Teshima | |
| 10,074,451 B2 | 9/2018 | Kottler et al. | |
| 10,076,297 B2 | 9/2018 | Bauer | |
| 10,085,701 B2 | 10/2018 | Hoshino | |
| 10,141,081 B2 | 11/2018 | Preusche | |
| 10,151,713 B2 | 12/2018 | Wu et al. | |
| 10,153,061 B2 | 12/2018 | Yokoyama | |
| 10,153,062 B2 | 12/2018 | Gall et al. | |
| 10,247,683 B2 | 4/2019 | Yun et al. | |
| 10,267,752 B2 | 4/2019 | Zhang et al. | |
| 10,267,753 B2 | 4/2019 | Zhang et al. | |
| 10,295,485 B2 | 5/2019 | Yun et al. | |
| 10,304,580 B2 | 5/2019 | Yun et al. | |
| 10,349,908 B2 | 7/2019 | Yun et al. | |
| 10,352,695 B2 | 7/2019 | Dziura et al. | |
| 10,352,880 B2 | 7/2019 | Yun et al. | |
| 10,401,309 B2 | 9/2019 | Yun et al. | |
| 10,416,099 B2 | 9/2019 | Yun et al. | |
| 10,466,185 B2 | 11/2019 | Yun et al. | |
| 10,473,598 B2 | 11/2019 | Ogata et al. | |
| 10,485,492 B2 | 11/2019 | Koehler et al. | |
| 10,514,345 B2 | 12/2019 | Ogata et al. | |
| 10,514,346 B2 | 12/2019 | Sako | |
| 10,568,588 B2 | 2/2020 | Koehler et al. | |
| 10,578,566 B2 | 3/2020 | Yun et al. | |
| 10,634,628 B2 | 4/2020 | Kasper et al. | |
| 10,653,376 B2 | 5/2020 | Yun et al. | |
| 10,697,902 B2 | 6/2020 | Sharma et al. | |
| 10,782,252 B2 | 9/2020 | Gateshki et al. | |
| 10,794,845 B2 | 10/2020 | Filsinger | |
| 10,895,541 B2 | 1/2021 | Shchegrov et al. | |
| 10,962,491 B2 * | 3/2021 | Yun | G21K 1/02 |
| 10,976,270 B2 | 4/2021 | Wormington | |
| 11,054,375 B2 | 6/2021 | Seidler et al. | |
| 11,175,243 B1 | 11/2021 | Yun et al. | |
| 11,215,572 B2 | 1/2022 | Yun et al. | |
| 11,378,530 B2 * | 7/2022 | Sato | G01N 23/2209 |
| 11,549,895 B2 | 1/2023 | Yun et al. | |
| 2001/0046276 A1 | 11/2001 | Schneider et al. | |
| 2002/0150208 A1 | 10/2002 | Yohkin et al. | |
| 2003/0072413 A1 | 4/2003 | Yokhin et al. | |
| 2003/0142781 A1 | 7/2003 | Kawahara | |
| 2003/0223536 A1 | 12/2003 | Yun et al. | |
| 2004/0028186 A1 | 2/2004 | Yokhin et al. | |
| 2004/0047446 A1 | 3/2004 | Platonov | |
| 2005/0087699 A1 | 4/2005 | Miyake | |
| 2005/0282300 A1 | 12/2005 | Yun et al. | |
| 2005/0286680 A1 | 12/2005 | Momose | |
| 2006/0062350 A1 | 3/2006 | Yokhin | |
| 2006/0088139 A1 | 4/2006 | Nankano et al. | |
| 2006/0182322 A1 | 8/2006 | Bernhardt et al. | |
| 2007/0108387 A1 | 5/2007 | Yun et al. | |
| 2007/0183563 A1 | 8/2007 | Baumann | |
| 2007/0183579 A1 | 8/2007 | Baumann et al. | |
| 2007/0189449 A1 | 8/2007 | Baumann | |
| 2007/0248215 A1 | 10/2007 | Ohshima et al. | |
| 2007/0285643 A1 | 12/2007 | Wedowski et al. | |
| 2008/0043908 A1 | 2/2008 | Teramoto et al. | |
| 2008/0084966 A1 | 4/2008 | Aoki et al. | |
| 2008/0159475 A1 | 7/2008 | Mazor et al. | |
| 2008/0170662 A1 | 7/2008 | Reinhold | |
| 2008/0181363 A1 | 7/2008 | Fenter et al. | |
| 2008/0273662 A1 | 11/2008 | Yun | |
| 2009/0052619 A1 | 2/2009 | Endoh | |
| 2009/0092227 A1 | 4/2009 | David | |
| 2009/0154640 A1 | 6/2009 | Baumann et al. | |
| 2009/0316857 A1 | 12/2009 | David et al. | |
| 2010/0061508 A1 | 3/2010 | Takahashi | |
| 2010/0091947 A1 | 4/2010 | Niu | |
| 2010/0111251 A1 * | 5/2010 | Yellepeddi | G01N 23/223 378/73 |
| 2010/0246765 A1 | 9/2010 | Murakoshi | |
| 2010/0260315 A1 | 10/2010 | Sato et al. | |
| 2010/0284513 A1 | 11/2010 | Kawabe | |
| 2010/0329532 A1 | 12/2010 | Masuda et al. | |
| 2011/0085641 A1 | 4/2011 | Okunuki et al. | |
| 2011/0243302 A1 | 10/2011 | Murakoshi | |
| 2011/0268252 A1 | 11/2011 | Ozawa et al. | |
| 2012/0041679 A1 | 2/2012 | Stampanoni | |
| 2012/0224670 A1 | 9/2012 | Kiyohara et al. | |
| 2012/0228475 A1 | 9/2012 | Pang et al. | |
| 2012/0294418 A1 * | 11/2012 | Yellepeddi | G01N 23/207 378/44 |
| 2013/0011040 A1 | 1/2013 | Kido et al. | |
| 2013/0039460 A1 | 2/2013 | Levy | |
| 2013/0108012 A1 | 5/2013 | Sato | |
| 2013/0108022 A1 | 5/2013 | Kugland et al. | |
| 2013/0251100 A1 | 9/2013 | Sasaki et al. | |
| 2013/0308112 A1 | 11/2013 | Clube et al. | |
| 2014/0023973 A1 | 1/2014 | Marconi et al. | |
| 2014/0037052 A1 | 2/2014 | Adler | |
| 2014/0064445 A1 | 3/2014 | Adler | |
| 2014/0072104 A1 | 3/2014 | Jacobsen et al. | |
| 2014/0105353 A1 | 4/2014 | Pfeiffer et al. | |
| 2014/0105363 A1 | 4/2014 | Chen et al. | |
| 2014/0112440 A1 | 4/2014 | David et al. | |
| 2014/0146945 A1 | 5/2014 | Fredenberg et al. | |
| 2014/0153692 A1 | 6/2014 | Larkin et al. | |
| 2014/0205057 A1 | 7/2014 | Koehler et al. | |
| 2014/0226785 A1 | 8/2014 | Stutman et al. | |
| 2014/0270060 A1 | 9/2014 | Date et al. | |
| 2015/0023472 A1 | 1/2015 | Schmitt et al. | |
| 2015/0030126 A1 | 1/2015 | Radicke | |
| 2015/0043713 A1 | 2/2015 | Chen | |
| 2015/0049860 A1 | 2/2015 | Das | |
| 2015/0051877 A1 | 2/2015 | Bakeman et al. | |
| 2015/0055743 A1 | 2/2015 | Vedantham et al. | |
| 2015/0055745 A1 | 2/2015 | Holzner et al. | |
| 2015/0071402 A1 | 3/2015 | Handa | |
| 2015/0117599 A1 | 4/2015 | Yun et al. | |
| 2015/0146847 A1 | 5/2015 | Liu | |
| 2015/0243397 A1 | 8/2015 | Yun et al. | |
| 2015/0247811 A1 | 9/2015 | Yun et al. | |
| 2015/0260663 A1 | 9/2015 | Yun et al. | |
| 2015/0270023 A1 | 9/2015 | Adler | |
| 2015/0323478 A1 | 11/2015 | Stutman | |
| 2015/0357069 A1 | 12/2015 | Yun et al. | |
| 2016/0066870 A1 | 3/2016 | Yun et al. | |
| 2016/0091701 A1 | 3/2016 | Raghunathan | |
| 2016/0178541 A1 | 6/2016 | Hwang et al. | |
| 2016/0206259 A1 | 7/2016 | Auclair et al. | |
| 2016/0336140 A1 | 11/2016 | Nonoguchi et al. | |
| 2016/0341674 A1 | 11/2016 | Wu et al. | |
| 2016/0351283 A1 | 12/2016 | Adler et al. | |

(56) References Cited

U.S. PATENT DOCUMENTS

| | | | |
|---|---|---|---|
| 2017/0038481 A1 | 2/2017 | Cheng et al. | |
| 2017/0047191 A1 | 2/2017 | Yun et al. | |
| 2017/0162288 A1 | 6/2017 | Yun et al. | |
| 2017/0176356 A1 | 6/2017 | Hoffman et al. | |
| 2017/0184520 A1 | 6/2017 | Mortensen et al. | |
| 2017/0227476 A1 | 8/2017 | Zhang et al. | |
| 2017/0234811 A1 | 8/2017 | Zhang et al. | |
| 2017/0261442 A1* | 9/2017 | Yun et al. | |
| 2017/0336334 A1 | 11/2017 | Yun et al. | |
| 2018/0182131 A1 | 6/2018 | Koehler et al. | |
| 2018/0202951 A1 | 7/2018 | Yun et al. | |
| 2018/0261352 A1 | 9/2018 | Matsuyama et al. | |
| 2018/0306734 A1 | 10/2018 | Morimoto et al. | |
| 2018/0323032 A1 | 11/2018 | Strelec et al. | |
| 2018/0348151 A1 | 12/2018 | Kasper et al. | |
| 2019/0011379 A1 | 1/2019 | Yun et al. | |
| 2019/0017946 A1 | 1/2019 | Wack et al. | |
| 2019/0027265 A1 | 1/2019 | Dey et al. | |
| 2019/0064084 A1 | 2/2019 | Ullom et al. | |
| 2019/0086342 A1 | 3/2019 | Pois et al. | |
| 2019/0115184 A1 | 4/2019 | Zalubovsky | |
| 2019/0145917 A1 | 5/2019 | Yun et al. | |
| 2019/0172681 A1 | 6/2019 | Owen et al. | |
| 2019/0204757 A1 | 7/2019 | Brussard et al. | |
| 2019/0206652 A1 | 7/2019 | Akinwande et al. | |
| 2019/0212281 A1 | 7/2019 | Shchgegrov | |
| 2019/0216416 A1 | 7/2019 | Koehler et al. | |
| 2019/0219713 A1 | 7/2019 | Booker et al. | |
| 2019/0257774 A1 | 8/2019 | Seidler et al. | |
| 2019/0261935 A1 | 8/2019 | Kitamura | |
| 2019/0302042 A1 | 10/2019 | Yun et al. | |
| 2019/0317027 A1 | 10/2019 | Tsuboi et al. | |
| 2019/0331616 A1 | 10/2019 | Schaff et al. | |
| 2019/0369271 A1 | 12/2019 | Yun et al. | |
| 2019/0369272 A1 | 12/2019 | Yun et al. | |
| 2019/0391087 A1 | 12/2019 | Matejka et al. | |
| 2020/0003712 A1 | 1/2020 | Kataoka et al. | |
| 2020/0041429 A1 | 2/2020 | Cho et al. | |
| 2020/0072770 A1 | 3/2020 | Yun et al. | |
| 2020/0088656 A1 | 3/2020 | Pois et al. | |
| 2020/0090826 A1 | 3/2020 | Adler | |
| 2020/0098537 A1 | 3/2020 | Yun et al. | |
| 2020/0103358 A1 | 4/2020 | Wiell et al. | |
| 2020/0155088 A1 | 5/2020 | Gruener et al. | |
| 2020/0158662 A1 | 5/2020 | Horiba et al. | |
| 2020/0182806 A1 | 6/2020 | Kappler et al. | |
| 2020/0225172 A1 | 7/2020 | Sato et al. | |
| 2020/0225173 A1 | 7/2020 | Sato et al. | |
| 2020/0225371 A1 | 7/2020 | Greenberg et al. | |
| 2020/0232937 A1 | 7/2020 | Yaroshenko et al. | |
| 2020/0279351 A1 | 9/2020 | Ratner et al. | |
| 2020/0292475 A1 | 9/2020 | Cao et al. | |
| 2020/0300789 A1 | 9/2020 | Osakabe et al. | |
| 2020/0300790 A1 | 9/2020 | Gellineau et al. | |
| 2020/0303265 A1 | 9/2020 | Gellineau et al. | |
| 2020/0319120 A1 | 10/2020 | Kitamura et al. | |
| 2020/0337659 A1 | 10/2020 | Sano et al. | |
| 2020/0378905 A1 | 12/2020 | Safai | |
| 2020/0378908 A1 | 12/2020 | Fujimura et al. | |
| 2020/0386696 A1* | 12/2020 | Sato | G01N 23/223 |
| 2021/0055237 A1 | 2/2021 | Shchegrov et al. | |
| 2021/0080408 A1 | 3/2021 | Yun et al. | |
| 2021/0255121 A1* | 8/2021 | Koskinen | G21K 1/06 |
| 2021/0356412 A1 | 11/2021 | Yun et al. | |
| 2022/0082515 A1 | 3/2022 | Yun et al. | |
| 2022/0178851 A1 | 6/2022 | Yun et al. | |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102325498 B | 1/2012 |
| CN | 102507623 A | 6/2012 |
| CN | 102551761 A | 7/2012 |
| CN | 103604818 A | 2/2014 |
| CN | 104068875 A | 5/2017 |
| EP | 0751533 | 1/1997 |
| EP | 1169713 | 1/2006 |
| EP | 3168856 A2 | 5/2017 |
| JP | H06-188092 | 7/1994 |
| JP | H07-194592 | 8/1995 |
| JP | H08-128971 | 5/1996 |
| JP | H08-184572 | 7/1996 |
| JP | H11-304728 | 11/1999 |
| JP | H11-352079 | 12/1999 |
| JP | 2001-021507 | 1/2001 |
| JP | 2001-124711 | 5/2001 |
| JP | 2001-235437 | 8/2001 |
| JP | 2003-149392 | 5/2003 |
| JP | 2006-501444 | 1/2006 |
| JP | 2007-218683 | 8/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2010-032341 A | 2/2010 |
| JP | 2010-236986 | 10/2010 |
| JP | 2011-033537 | 2/2011 |
| JP | 2011-095224 | 5/2011 |
| JP | 2011-218147 | 11/2011 |
| JP | 2012-032387 | 2/2012 |
| JP | 2012-187341 | 10/2012 |
| JP | 2012-254294 | 12/2012 |
| JP | 2013-508683 | 3/2013 |
| JP | 2013-096750 | 5/2013 |
| JP | 2013-113782 | 6/2013 |
| JP | 2013-529984 | 7/2013 |
| JP | 2013-181811 | 9/2013 |
| JP | 2014-178130 | 9/2014 |
| JP | 2015-047306 | 3/2015 |
| JP | 2015-072263 | 4/2015 |
| JP | 2015-077289 | 4/2015 |
| JP | 2017-040618 | 2/2017 |
| JP | 2019078593 A * | 5/2019 |
| KR | 10-2004-0072780 | 8/2004 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| KR | 20120088621 A * | 12/2020 |
| WO | WO 1998/041992 | 9/1998 |
| WO | WO 2007/125833 | 11/2007 |
| WO | WO 2008/068044 | 6/2008 |
| WO | WO 2009/104560 | 8/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

Altapova et al., "Phase contrast laminography based on Talbot interferometry," Opt. Express, vol. 20, No. 6, (2012) pp. 6496-6508.
Anklamm et al., "A novel von Hamos spectrometer for efficient X-ray emission spectroscopy in the laboratory," Rev. Sci. Instr. vol. 85 p. 053110 (2014).
Bachucki et al., "Laboratory-based double X-ray spectrometer for simultaneous X-ray emission and X-ray absorption studies," J. Anal. Atomic Spectr. DOI:10.1039/C9JA00159J (2019).

(56) References Cited

OTHER PUBLICATIONS

Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).
Bech, "X-ray imaging with a grating interferometer," University of Copenhagen PhD. Thesis, (May 1, 2009).
Bech, "In-vivo dark-field and phase-contrast x-ray imaging," Scientific Reports 3, (2013), Article No. 03209.
Bertaux et al., "Sub-pixel high-resolution imaging of high-energy x-rays inspired by sub-wavelength optical imaging," Op. Express, vol. 29, No. 22-25, p. 35003 (2021).
Birkholz, "Chapter 4: Grazing Incidence Configurations," Thin Film Analysis by X-ray Scattering (Wiley-VCH Verlag Gmbh & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-034001-8 (2023).
Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).
Buchanan et al., "Effective modelling of high-energy laboratory-based x-ray phase contrast imaging utilising absorption masks or gratings," J. Appl. Physics (accepted) (2020).
Chen et al., "Advance in detection of low sulfur content by wavelength dispersive XRF," Proceedings of the Annual ISA Analysis Division Symposium (2002).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cohen et al., "Tunable laboratory extended x-ray absorption fine structure system," Rev. Sci. Instr. Vol. 51, No. 3, Mar. 1980, pp. 273-277.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Detlefs et al., "Fast Chemical Contrast by X-ray Fluorescence Intensity Ratio Detection," Anal. Chem., https://doi.org/10.1021/acs.analchem.3c00623 (2023).
Dewulf et al., "Advances in the metrological traceability and performance of X-ray computed tomography," CIRP Annals—Manuf. Tech. vol. 00, 1-24 (2022).
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).
Dibernardo, "Non-disruptive techniques for depth profiling in photoemission spectroscopy," Nature Review Physics, https://doi.org/10.1038/s42254-021-00331-4 (2021).
Dittler et al., "A mail-in and user facility for X-ray absorption near-edge structure: the CEI-XANES laboratory X-ray spectrometer at University of Washington," J. Synch. Rad. vol. 26, eight pages, (2019).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Du et al., "Removal of artifacts caused by grating imperfections in X-ray phase contrast tomography," J. of Inst. vol. 16, P06039, doi.org/10.1088/1748-0221/16/06/P06039 (2021).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Espes et al., "High-resolution X-ray source with advanced e-beam technology: pushing the resolution limitation for lab-scale NanoCT," Micros. Microanal., vol. 27 (Suppl. 1), pp. 1230 (2021).
Feng et al., "Reduction of Compton Background Noise for X-ray Fluorescence Computed Tomography with Deep Learning," Photonics, vol. 9, p. 108 (2022).
Fernández-Ruiz, "TXRF Spectrometry as a Powerful Tool for the Study of Metallic Traces in Biological Systems," Development in Analytical Chemistry, vol. 1 (2014), pp. 1-14.
Fisher et al., "Laminography in the lab: imaging planar objects using a conventional x-ray CT scanner," Meas. Sci. Technol., vol. 30, p. 035401 (2019).
Flenner et al., "Hard X-ray full-field nanoimaging using a direct photon-counting detector," J. Synch. Rad., https://doi.org/10.1107/S1600577522012103 (2022).
Gaur et al., "On the method of calibration of the energy dispersive EXAFS beamline and Indus-2 and fitting theoretical model to the EXAFS spectrum," Sadhana, vol. 36, No. 3 pp. 3390348 (2011).
Ge et al., "Investigation of the partially coherent effects in a 2D Talbot interferometer," Anal. Bioanal. Chem. vol. 401, (2011), pp. 865-870.
Ge et al., "Self-absorption correction on 2D X-ray fluorescence maps," Sci. Rep. 13, p. 7271, https://doi.org/10.1038/s41598-023-33383-w (2023).
Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).
Graetz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.
Günther et al., "Full-field structured-illumination super-resolution X-ray transmission microscopy," Nature Comm. 10:2494 (2019) and supplementary information.
Gustschin et al., "High resolution and sensitivity bi-directional x-ray phase contrast imaging using 2D Talbot array illuminators," arXiv:2105.07347v1 [physics.med-ph] May 16, 2021.
Harasse et al., "X-ray Phase Laminography with Talbot Interferometer", in Developments in X-Ray Tomography VII, Proc. SPIE vol. 7804 (2010), 780411.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Hashimoto et al., "Improved reconstruction method for phase stepping data with stepping errors and dose fluctuations," Optics Express, vol. 28, No. 11, pp. 16363-16384 (2020).
Haug et al., A laboratory-based multifunctional near ambient pressure X-ray photoelectron spectroscopy system for electrochemical, catalytic, and cryogenic studies, Rev. Sci. Instr. vol. 94, 065104, https://doi.org/10.1063/5.0151755 (2023).
Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).
Hemraj-Benny et al., "Near-Edge X-ray Absorption Fine Structure Spectroscopy as a Tool for Investigating Nanomaterials," Small, vol. 2(1), (2006), pp. 26-35.
Hennekam et al., "Trace metal analysis of sediment cores using a novel X-ray fluorescence core scanning method," Quaternary Int'l, https://doi.org/10.1016/j.quaint.2018.10.018 (2018).
Hirano et al., "X-ray zooming optics for analyzer-based multi-contrast computed tomography," J. Synch. Rad. vol. 29, https://doi.org/10.1107/S1600577522001412 (2022).

(56) References Cited

OTHER PUBLICATIONS

Holberg et al., "High-Resolution Table-Top NEXAFS Spectroscopy," Anal. Chem. https://10.1021/acs.analchem.1c04374 (2022).
Holfelder et al., "A double crystal von Hamos spectrometer for traceable x-ray emission spectroscopy," Rev. Sci. Instrum. vol 92, p. 123105 (2021).
Honma et al., Full-automatic XAFS Measurement System of the Engineering Science Research II beamline BL14B2 at Spring-8, 2011, AIP Conference Proceedings 1234, pp. 13-16.
Hoshino et al., "High-energy X-ray micro-laminography to visualize microstructures in dense planar object," J. Synch. Rad. https://doi.org/10.1107/S1600577522012176 (2022).
Howard et al., "High-Definition X-ray Fluorescence Elemental Mapping of Paintings," Anal. Chem., 2012, vol. 84(7), pp. 3278-3286.
Hu et al., "Improving small animal cone beam CT resolution by mitigating x-ray focal spot induced blurring via deconvolution," Phys. Med. Bio., in press, https://doi.org/10.1088/1361-6560/ac6b7a (2022).
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Janssens et al., "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. Vol. 90, 013106 (2019).
Jiang et al., "X-Ray Phase-Contrast Imaging with Three 2D Gratings," Int. J. Biomed. Imaging, (2008), 827152, 8 pages.
Kalasová et al., "Characterization of a laboratory-based X-ray computed nanotomography system for propagation-based method of phase contrast imaging," IEEE Trans. on Instr. and Meas., DOI 10.1109/TIM.2019.2910338 (2019).
Keyrilainen et al., "Phase contrast X-ray imaging of breast," Acta Radiologica, vol. 51 (8), (2010), pp. 866-884.
Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of the Pohang Light Source—II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kiranjot et al., "Surface and interface characterization of Ru/C/Ru trilayer structure using grazing incidence X-ray reflectivity and X-ray fluorescence," Surf. And Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.

Klockenkamper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kulow et al., "On the Way to Full-Field X-ray Fluorescence Spectroscopy Imaging with Coded Apertures," J. Anal. At. Spectrom. Doi: 10.1039/C9JA00232D (2019).
Kuwabara et al., "Hard-X-ray Phase-Difference Microscopy with a Low-Brilliance Laboratory X-ray Source", Appl. Phys. Express vol. 4 (2011) 062502.
Leatham et al., "X-ray dark-field and phase retrieval without optics, via the Fokker-Planck equation," arXiv:2122.10999v1, physics.med-ph, Dec. 21, 2021.
Lei et al., "8-inch-diameter field of view for X-ray differential phase-contrast imaging," Nucl. Inst. and Methods in Physics Research A, https://doi.org/10-1016/j.nima.2021.165375 (2021).
Li et al., "X-ray phase-contrast imaging using cascade Talbot-Lau interferometers," Proc. SPIE 10964 (2018), pp. 1096469-1-1096469-6.
Lin et al., "Quasi-Monte Carlo method for calculating X-ray scatter in CT," Op. Express, vol. 29, No. 9, p. 13746 (2021).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Lübcke et al., "Soft X-ray nanoscale imaging using a sub-pixel resolution charge coupled device (CCD) camera," Rev. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).
Matsunaga et al., "Development of projection X-ray microscope with 10 nm spot size," Nodestr. Test. And Eval., https://doi.org.10.1080/10589759.2022.2083616 (2022).
Matsuyama et al., "Wavefront measurement for a hard-X-ray nanobeam using single-grating interferometry", Opt Express vol. 20 (2012), pp. 24977-24986.
Menzies et al., "Dual source X-ray and electron SEM system: Elemental mapping of an Epithermal gold-bearing sample from Karangahake, New Zealand," Microsc. Microanal., vol. 27 (Suppl. 1), p. 456 (2021).
Miao et al., "Motionless phase stepping in X-ray phase contrast imaging with a compact source," Proceedings of the National Academy of Sciences, vol. 110(48), (2013), pp. 19268-19272.
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Phase-Contrast X-Ray Imaging Using an X-Ray Interferometer for Biological Imaging", Analytical Sciences vol. 17 Supplement (2001), pp. i527-i530.

(56) References Cited

OTHER PUBLICATIONS

Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. Vol. 45 2006 pp. 5254-5262.
Momose et al., "X-ray Talbot Interferometry with Capillary Plates", Jpn. J. Appl. Phys. vol. 45 (2006), pp. 314-316.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys. vol. 47 (2008), pp. 8077-8080.
Momose et al., "Grating-Based X-ray Phase Imaging Using Multiline X-ray Source", Jpn. J. Appl. Phys. Vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging Using Lau Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings," Quantum Beam Science, vol. 4, No. 9; doi:10.3390/qubs4010009 (2020).
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Nemeth et al., "Laboratory von Hamos X-ray Spectroscopy for Routine Sample Characterization, " arvix:1607.08045v1 (2016).

Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Nykanen et al., "X-ray scattering in full-field digital mammography," Med. Phys. Vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. of SPIE 12304, 7th Int'l Conf. on Image Formation in X-Ray Computed Tomography, 123042L, doi:10.1117/12.2646492 (2022).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., "Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).

(56) References Cited

OTHER PUBLICATIONS

Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X- Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Seifert et al., "Talbot-Lau x-ray phase-contrast setup for fast scanning of large samples," Sci. Rep. 9:4199, pp. 1-11 (2019).
Shi et al., "Laboratory X-ray interferometry imaging with a fan-shaped source grating," Optics Lett., doi.org/10.1364/OL.426867 (2021).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Sunday et al., "X-ray Metrology for the Semiconductor Industry Tutorial," J. Res. Nat'l Inst. Stan. Vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. Vol. 31, No. 2, pp. 1677-1691 (2023).
Tao et al., "Moire artifacts reduction in Talbot-Lau X-ray phase contrast imaging using a three-step iterative approach," Opt. Ex. Vol. 30, No. 20, pp. 35096-35111 (2022).
Tao et al., "Factors Affecting the Spatial Resolution in 2D Grating-Based X-Ray Phase Contrast Imaging," Frontiers in Physics, doi: 10.3389/fphy.2021.672207 (2021).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), p. 2890 (2021).
Tkachuk et al., "High-resolution x-ray tomography using laboratory sources", in Developments in X- Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot-Lau Interferometer", Jpn. J. Appl. Phys. vol. 47 (2008), pp. 7412-7414.

(56) References Cited

OTHER PUBLICATIONS

Wang et al., "Advantages of intermediate X-ray energies in Zernike phase contrast X-ray microscopy," Biotech. Adv., vol. 31 (2013) pp. 387-392.
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Withers et al., "X-ray computed tomography," Nature Reviews | Methods Primers, vol. 1, No. 18, pp. 1-21 (2021).
Witte et al., "From 2D Stxm to 3D Imaging: Soft X-ray Laminography of Thin Specimens," Nano Lett. Vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).
Woicik et al., "Soft X-ray absorption spectra," Int. Tables Crystallogr. vol. 1, https://doi.org.10.1107/51574870720008484 (2023).
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Synchrotron radiation computed laminography for polymer composite failure studies," J. Synch. Rad., vol. 17, pp. 222-226 (2010).
Xu et al., "Comparison of image quality in computed laminography and tomography," Op. Express, vol. 20, No. 2, pp. 794-806 (2012).
Yamada et al., "Compact full-field hard x-ray microscope based on advanced Kirkpatrick-Baez mirrors," Optica, vol. 7, No. 4 pp. 367-370 (2020).
Yashiro et al., "Optimal Design of Transmission Grating for X-ray Talbot Interferometer", Advances in X-ray Analysis vol. 49(3) (2006), pp. 375-379.
Yashiro et al., "Efficiency of capturing a phase image using cone-beam x-ray Talbot interferometry", J. Opt. Soc. Am. A vol. 25 (2008), pp. 2025-2039.
Yashiro et al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.
Yashiro et al., "On the origin of visibility contrast in x-ray Talbot interferometry", Opt. Express (2010), pp. 16890-16901.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Distribution of unresolvable anisotropic microstructures revealed in visibility-contrast images using x-ray Talbot interferometry", Phys. Rev. B vol. 84 (2011), 094106.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhan et al., "A Lightweight Method for Detecting IC Wire Bonding Defects in X-ray Images," Micromachines, vol. 14, p. 1119, https://doi.org/10.3390/mi14061119 (2023).
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhang et al., "Laboratory-scale X-ray absorption spectrometer with a cylindrical Johansson crystal analyzer," Nuclear Inst. and Methods in Physics Research, A (2023), doi: https://doi.org/10.1016/j.nima.2023.168067 (2023).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Zhao et al., "X-ray wavefront sensing and optics metrology using a microfocus x-ray grating interferometer with electromagnetic phase stepping," Appl. Phys. Lett. 120, 181105 (2022).
Zhu et al., "Optical Wafer Defect Inspection at the 10 nm Technology Node and Beyond," 2022 Int. Extrem. Manuf. In press https://doi.org/10.1088/2631-7990/ac64d7 (2022).

* cited by examiner

X-RAY SEQUENTIAL ARRAY WAVELENGTH DISPERSIVE SPECTROMETER

CLAIM OF PRIORITY

This application claims the benefit of priority to U.S. Provisional Appl. No. 63/337,407 filed May 2, 2022 which is incorporated in its entirety by reference herein.

BACKGROUND

Field

This application relates generally to apparatus and methods for x-ray spectroscopies, examples of which include but are not limited to: x-ray absorption spectroscopy (XAS); x-ray emission spectroscopy (XES); x-ray fluorescence spectroscopy (XFS).

Description of the Related Art

An x-ray wavelength dispersive spectrometer (WDS) typically comprises (i) a diffractor comprising a crystal or a synthetic multilayer, the diffractor configured to disperse incident x-rays according to the Bragg law: $2*d*\sin(\theta)=n*\lambda$, where d is the lattice spacing of the crystal or the layer spacing of the multilayers, $\theta$ is the Bragg angle (e.g., the angle between the incident x-rays and the lattice planes of the crystal or the layers of the multilayer), n is an integer, and $\lambda$ is the wavelength of x-rays that satisfies the Bragg law for the values of d and $\theta$ and (ii) a detector configured to record a portion of the x-rays dispersed by the diffractor.

WDSs typically offer significantly higher energy resolution than do energy dispersive spectrometers (EDSs), and are widely used for x-ray spectral analysis in scanning electron microscope (SEM) spectroscopy, electron microprobe analyzers (EMPAs), particle induced x-ray emission (PIXE) spectroscopy. x-ray fluorescence (XRF) analysis, total external reflection x-ray fluorescence (TXRF) analysis, x-ray emission spectroscopy (XES), and x-ray absorption spectroscopy (XAS). For XRF measurements, EDSs can collect x-rays over a large energy range and can measure many atomic elements simultaneously, while WDSs can measure an x-ray spectrum sequentially but with better energy resolution, better detection sensitivity, and reduction of spectral interference as compared to EDSs.

SUMMARY

In certain implementations, an apparatus (e.g., a sequential array wavelength dispersive spectrometer) is configured to receive x-rays propagating from an x-ray source along an x-ray propagation direction. The apparatus comprises a plurality of x-ray diffractors along the x-ray propagation direction. The plurality of x-ray diffractors comprises at least a first x-ray diffractor and a second x-ray diffractor, the second x-ray diffractor downstream from the first x-ray diffractor. The apparatus further comprises a plurality of x-ray detectors comprising at least a first x-ray detector and a second x-ray detector. The first x-ray diffractor is configured to receive the x-rays, to diffract a first spectral band of the x-rays to the first x-ray detector, and to transmit at least 2% of the received x-rays to the second x-ray diffractor. The second x-ray diffractor is configured to receive the transmitted x-rays from the first x-ray diffractor and to diffract a second spectral band of the x-rays to the second x-ray detector. The first x-ray detector comprises at least one first active element configured to measure a first spectrum of at least a portion of the first spectral band of the x-rays and the second x-ray detector comprises at least one second active element configured to measure a second spectrum of at least a portion of the second spectral band of the x-rays.

DETAILED DESCRIPTION

Figure 1A:
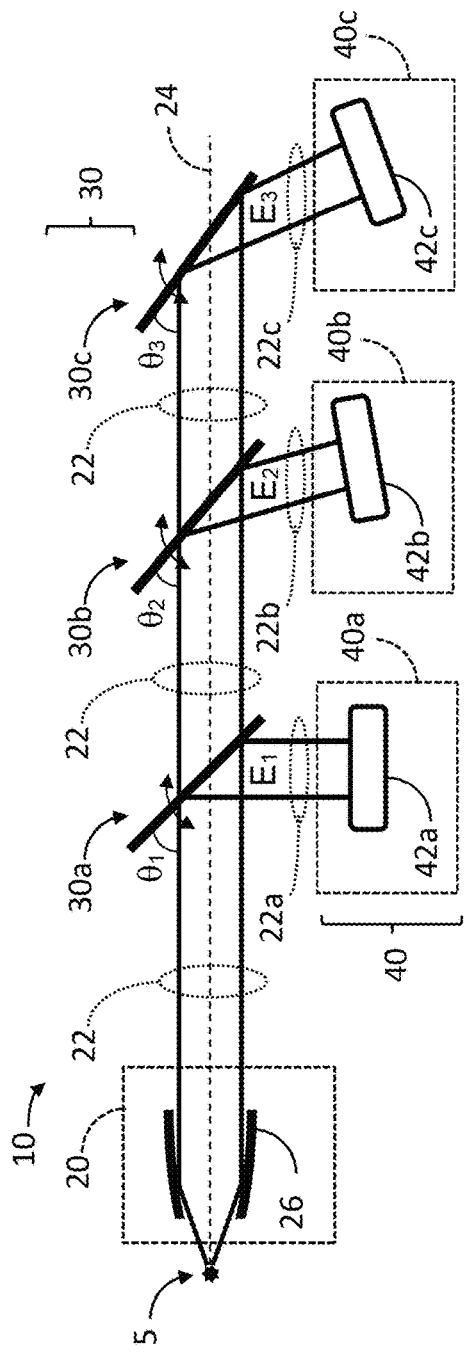
FIGS. 1A and 1B schematically illustrate two example apparatus comprising a plurality of substantially flat x-ray diffractors and a plurality of x-ray detectors in accordance with certain implementations described herein.

X-rays analyzed by conventional WDSs are incident on a point on the diffractor along an x-ray propagation direction, and only those x-rays within a narrow energy bandwidth that satisfies the Bragg law are diffracted, while x-rays outside this narrow energy bandwidth are not used and are typically absorbed by the diffractor, resulting in loss of spectral information contained in the absorbed x-rays. As a result, conventional WDSs used in many systems (e.g., SEM spectroscopy, EMPAs, PIXE spectroscopy, XRF analysis. TXRF analysis, XES, and XAS) have limited analysis speeds and throughput.

Certain implementations described herein provide an x-ray sequential array wavelength dispersive spectrometer (SA-WDS) characterized with multiple crystals configured sequentially along an x-ray propagation direction from an x-ray source. The multiple crystals include at least one upstream crystal having greater than 2% transmission of x-rays with at least some of the transmitted x-rays diffracted by at least one downstream crystal. Certain implementations described herein provide methods of using an x-ray SA-WDS for x-ray absorption spectroscopy (XAS), x-ray emission spectroscopy (XES), and/or x-ray fluorescence spectroscopy (XFS). In certain implementations, the SA-WDS disclosed herein can be used to speed up data collection dramatically by multiplexing the data acquisition process, splitting different x-ray energies onto different x-ray detectors operating simultaneously. Certain implementations described herein are configured to speed up data collection as compared to single-energy-at-a-time WDS instruments and can be used with other radiation sources (e.g., laser-plasma; high gain harmonic generation (HGHG); astronomical X-ray spectroscopy).

Certain implementations described herein provide an x-ray SA-WDS comprising a plurality of x-ray diffractors (e.g., crystals and/or multilayers) positioned sequentially along an x-ray beam propagating direction (e.g., a longitudinal array of x-ray diffractors) extending from a source of x-rays (e.g., collimated x-rays; diverging x-rays). At least one upstream x-ray diffractor of the plurality of x-ray diffractors configured to receive x-rays from the x-ray source, to diffract at least some of the received x-rays, and to transmit at least 2% of the received x-rays to at least one downstream x-ray diffractor of the plurality of x-ray diffractors. The at least one downstream x-ray diffractor is configured to diffract at least some of the transmitted x-rays received from the at least one upstream x-ray diffractor. The x-rays diffracted by the at least one upstream x-ray diffractor have a first energy and the x-rays diffracted by the at least one downstream x-ray diffractor have a second energy different from the first energy by at least 1 eV. The x-ray SA-WDS further comprises at least one first x-ray detector configured to receive the x-rays diffracted by the at least one upstream x-ray diffractor and at least one second x-ray detector configured to receive the x-rays diffracted by the at least one downstream x-ray diffractor. The at least one first x-ray detector and the at least one second x-ray detector configured to generate spectral measurements (e.g., with an energy resolution) of the received x-rays (e.g., x-ray intensity distribution as a function of x-ray energy).

FIGS. 1A, 1B, 2A, 3, 4, 5, and 6 schematically illustrate various example apparatus 10 (e.g., x-ray SA-WDS) in accordance with certain implementations described herein. The apparatus 10 is configured to receive x-rays 22 from an x-ray source 5 and comprises a plurality of x-ray diffractors 30 positioned (e.g., arranged sequentially) along an x-ray propagation direction 24 of the x-rays 22 and a plurality of x-ray detectors 40. The plurality of x-ray diffractors 30 comprising at least a first x-ray diffractor 30a (e.g., an upstream x-ray diffractor) and a second x-ray diffractor 30b (e.g., a downstream x-ray diffractor) and the plurality of x-ray detectors 40 comprising at least a first x-ray detector 40a and a second x-ray detector 40b. The first x-ray diffractor 30a is configured to receive the x-rays 22, to diffract a first spectral band 22a of the x-rays 22 (e.g., a first fraction of the x-rays 22 having a first energy range) to the first x-ray detector 40a, and to transmit at least 2% (e.g., at least 5%) of the x-rays 22 to the second x-ray diffractor 30b. The second x-ray diffractor 30b is configured to receive the transmitted x-rays 22 from the first x-ray diffractor 30a and to diffract a second spectral band 22b of the x-rays 22 (e.g., a second fraction of the x-rays 22 having a second energy range) to the second x-ray detector 40b. The first x-ray detector 40a comprises at least one first active element 42a configured to measure a first spectrum (e.g., generate spectral measurements) of at least a portion of the first spectral band 22a of the x-rays 22 and the second x-ray detector 40b comprises at least one second active element 42b configured to measure a second spectrum (e.g., generate spectral measurements) of at least a portion of the second spectral band 22b of the x-rays 22. The first energy range and/or the second energy range can include energies from less than 2 eV to up to 500 eV.

In certain implementations, the x-ray source 5 is configured to generate the x-rays 22 in response to incidence of ionizing radiation (e.g., x-rays; charged particles; electrons; protons). For example, the x-ray source 5 can comprise a sample to be analyzed using the apparatus 10, with the sample irradiated by ionizing radiation to generate the x-rays 22 (e.g., the sample irradiated by a conventional laboratory source of electrons or x-rays, synchrotron radiation source, or other x-ray source that emits broadband or multi-energy x-rays). In certain implementations, the x-ray source 5 is not a component of the apparatus 10, while in certain other implementations, the x-ray source 5 is a component of the apparatus 10.

In certain implementations (see, e.g., FIGS. 1A and 1B), the plurality of x-ray diffractor 30 further comprises a third x-ray diffractor 30c and the plurality of x-ray detectors 40 further comprises a third x-ray detector 40c. The second x-ray diffractor 30b is configured to transmit at least 2% (e.g., at least 5%) of the x-rays 22 received from the first x-ray diffractor 30a to the third x-ray diffractor 30c. The third x-ray diffractor 30c is configured to receive the transmitted x-rays 22 from the second x-ray diffractor 30b and to diffract a third spectral band 22c of the x-rays 22 (e.g., a third fraction of the x-rays 22 having a third energy range) to the third x-ray detector 40c. The third x-ray detector 40c comprises at least one third active element 42c configured to measure a third spectrum (e.g., generate spectral measurements) of at least a portion of the third spectral band 22c of the x-rays 22. Other numbers of x-ray diffractors 30 (e.g., 2, 4, 5, 6, or more) and other numbers of x-ray detectors 40 (e.g., 2, 4, 5, 6, or more) are also compatible with certain implementations described herein.

Figure 1B:
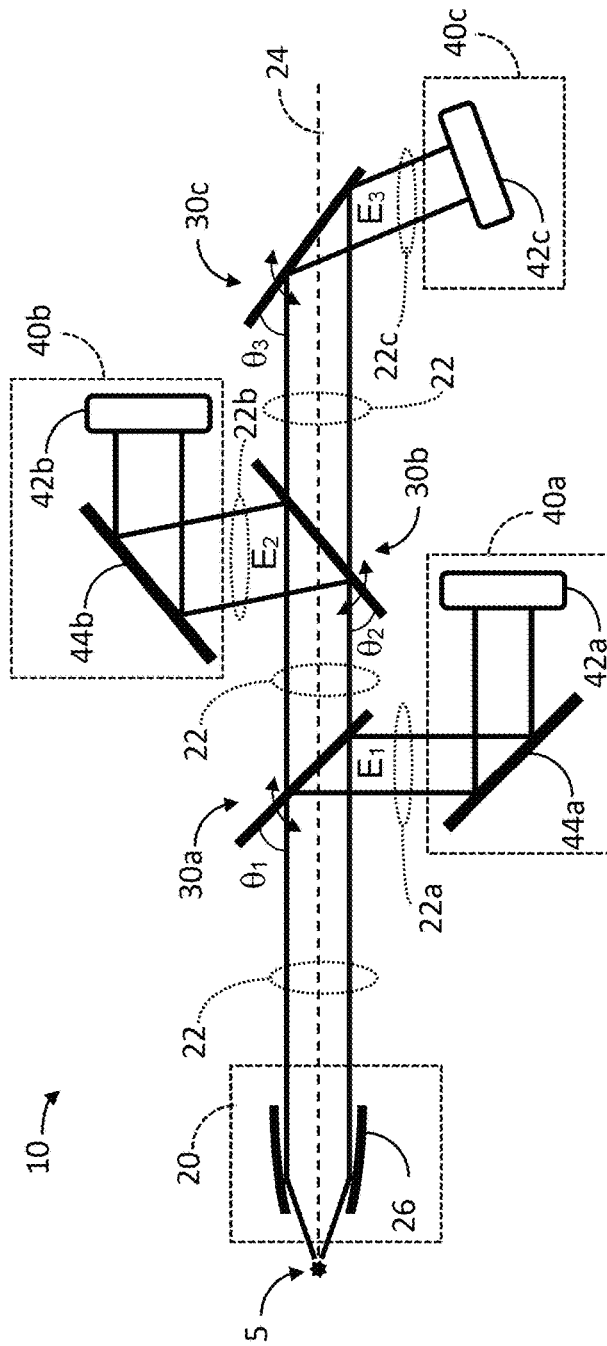

In certain implementations, as schematically illustrated by FIGS. 1A and 1B, the apparatus 10 further comprises an x-ray collimator 20 configured to receive x-rays 22 (e.g., from the x-ray source 5 such as a sample under analysis) and to collimate at least some of the x-rays 22 (e.g., to reduce a divergence angle of at least some of the x-rays 22 to less than 1 degree, less than 0.1 degree, or less than 0.01 degree). The first x-ray diffractor 30a is configured to receive the collimated x-rays 22 from the x-ray collimator 20.

In certain implementations, the x-rays 22 from the x-ray collimator 20 are incident to the first x-ray diffractor 30a at a first Bragg angle $\theta_1$ and the first spectral band 22a of the x-rays 22 diffracted by the first x-ray diffractor 30a to the first x-ray detector 40a have a first central x-ray energy $E_1$ (e.g., corresponding to a first wavelength $\lambda_1$ satisfying the Bragg law for the first lattice/layer spacing $d_1$ of the first x-ray diffractor 30a and the first Bragg angle $\theta_1$). The x-rays 22 from the first x-ray diffractor 30a are incident to the second x-ray diffractor 30b at a second Bragg angle $\theta 2$ and the second spectral band 22b of the x-rays 22 diffracted by the second x-ray diffractor 30b to the second x-ray detector 40b have a second central x-ray energy $E_2$ (e.g., corresponding to a second wavelength $\lambda_2$ satisfying the Bragg law for the second lattice/layer spacing $d_2$ of the second x-ray diffractor 30b and the second Bragg angle $\theta_2$). As schematically illustrated by FIGS. 1A and 1B in which the plurality of x-ray diffractors 30 comprises a third x-ray diffractor 30c, the x-rays 22 from the second x-ray diffractor 30b are incident to the third x-ray diffractor 30c at a third Bragg angle $\theta_3$ and the third spectral band 22c of the x-rays 22 diffracted by the third x-ray diffractor 30c to the third x-ray detector 40c have a third central x-ray energy $E_3$ (e.g., corresponding to a third wavelength $\lambda_3$ satisfying the Bragg law for the third lattice/layer spacing $d_3$ of the third x-ray diffractor 30c and the third Bragg angle $\theta_3$).

Figure 2B:
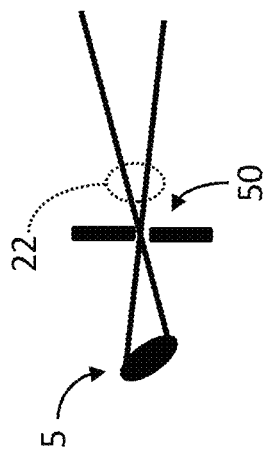
FIG. 2B schematically illustrates an aperture configured to produce an effective small x-ray source in the dispersion planes of the plurality of x-ray diffractors in accordance with certain implementations described herein.

In certain implementations, as schematically illustrated by FIGS. 2A, 3, 4, 5, and 6, the apparatus 10 does not comprise an x-ray collimator, and the apparatus 10 receives diverging x-rays 22 from an x-ray source 5. In certain implementations, the x-ray source 5 is small in the dispersion planes of the plurality of x-ray diffractors 30 (e.g., width less than 100 microns), and the first x-ray diffractor 30a receives the x-rays 22 from the x-ray source 5. In certain other implementations in which the x-ray source 5 is not small (e.g., an extended x-ray source 5), the apparatus 10 can comprise an aperture 50 (e.g., slit; orifice) having a width less than 100 microns to produce an effective small (e.g., narrow) x-ray source in the dispersion planes of the plurality of x-ray diffractors 30, as schematically illustrated by FIG. 2B.

X-Ray Collimator

In certain implementations, the x-ray collimator 20 comprises at least one mirror optic 26 having a functional surface with at least one portion of the surface having a quadric surface profile (e.g., paraboloidal shape; hyperboloidal shape). For example, as schematically illustrated by FIGS. 1A and 1B, the mirror optic 26 can comprise an axially symmetric paraboloidal mirror optic (e.g., a paraboloidal mirror lens), such as a glass capillary with an inner surface with a paraboloidal surface profile, having a focal point aligned with the x-ray source 5. The mirror optic 26 is configured to receive the x-rays 22 from the x-ray source 5 over a solid angle of collection and to reflect the x-rays 22 into a substantially collimated x-ray beam. For another example, the mirror optic 26 can comprise a Wolter optic having a hyperboloidal segment and a paraboloidal segment configured such that a focus of the hyperboloidal segment is aligned with the x-ray source 5 and the focus of the paraboloidal segment is aligned to another focus of the hyperboloidal segment. In certain implementations, the x-ray collimator 20 is rotationally symmetric about a longitudinal axis and extends more than 15 degrees around the longitudinal axis.

Figure 1D:
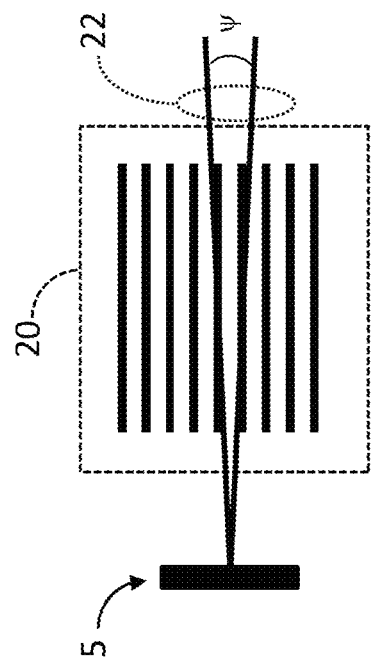
FIGS. 1C and 1D schematically illustrate other example x-ray collimators in accordance with certain implementations described herein.
Figure 1C:
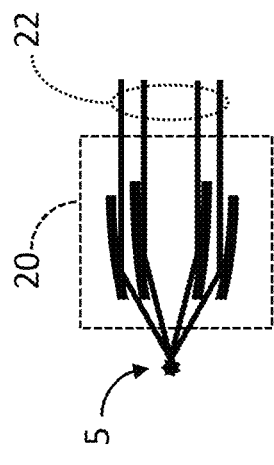

FIGS. 1C and 1D schematically illustrate other example x-ray collimators 20 in accordance with certain implementations described herein. In certain implementations, as schematically illustrated by FIG. 1C, the x-ray collimator 20 can comprise a polycapillary optic or a plurality of nested mirror optics (e.g., nested paraboloidal mirror optics; a paraboloidal mirror lens co-axially nested inside a Wolter optic), each polycapillary optic or nested mirror optic receiving the x-rays 22 from the x-ray source 5 over a corresponding solid angle of collection and reflecting the x-rays into a substantially collimated x-ray beam. In certain implementations, as schematically illustrated by FIG. 1D, the x-ray collimator 20 comprises at least one Soller slit configured to receive the x-rays 22 from the x-ray source 5 (e.g., an extended x-ray source) and to limit the angular spread V of the x-rays 22 emitted from the at least one Soller slit.

In certain implementations, the x-ray collimator 20 comprises a substrate (e.g., glass) and the inner surface of the x-ray collimator 20 is coated with at least one layer (e.g., having a thickness greater than 20 nanometers) having a higher mass density to increase the collection angle of x-rays from the x-ray source 5 and to improve the throughput of the apparatus 10. Example materials for the at least one layer include but are not limited to higher atomic number (Z) materials such as Ni, Rh, Pt, Ir, etc. or compound materials such as oxides, nitrides, or carbides. In certain implementations, the inner reflection surface of the x-ray collimator is coated with at least one multilayer of alternating materials, examples of which include but are not limited to: W/Si; Mo/Si; W/C; Mo/C; W/B$_4$C; etc. In certain implementations, to increase the collection angle of x-rays of predetermined (e.g., central) energy and energy bandwidth, the at least one multilayer comprises laterally grated multilayers (e.g., the total thickness of each bilayer is constant but varies along the length of the reflection surface) and/or depth graded multilayers (e.g., the total thickness of the bilayer can vary along the depth of the multilayer). The layer thicknesses of constant thickness, depth graded, and laterally graded multilayers can be configured to efficiently reflect x-rays with energies in a predetermined bandwidth while substantially reducing (e.g., not efficiently reflecting) x-rays with energies outside the predetermined bandwidth. For nested co-axial mirrors, the functional surface of the mirror optics can have different coating than one another (e.g., a functional surface of an inner mirror optic having a Pt coating while the functional surfaces of one or more outer mirror optics have multilayer coatings).

In certain implementations, the collimating mirror optic 26 is configured to have a critical angle of reflection that maximizes the reflected x-ray flux in a predetermined energy range and that substantially reduces (e.g., does not efficiently reflect) x-rays with energies outside the predetermined bandwidth and that would otherwise cause background signal contributions in the form of scattering or higher order harmonics from crystal reflections. For example, the collimating mirror optic 26 can be configured to have a high energy cut off that is less than twice the maximum operating energy for the collimating mirror optic. In certain implementations, to cover a wide operating energy range, the x-ray collimator 20 comprises a plurality of collimating mirrors, each collimating mirror optimized for a corresponding predetermined x-ray energy range. In certain implementations, the x-ray collimator 20 comprises a substantially flat mirror configured to receive the x-rays 22 from the collimating mirror optic 26, the substantially flat mirror configured to reflect x-rays 22 with a high energy cut off.

X-Ray Diffractors

In certain implementations, at least one x-ray diffractor 30 of the plurality of x-ray diffractors 30 comprises at least one crystalline material (e.g., single crystal type; mosaic crystal type; substantially flat; substantially curved or bent), examples of which include but are not limited to: graphite, highly oriented pyrolytic graphite (HOPG), highly annealed pyrolytic graphite (HAPG), diamond, quartz, LiF (e.g., LiF(111); LiF(200)), Si (e.g., Si(111); Si(220); Si(400)), and Ge (e.g., Ge(111); Ge(220); Ge(311)). In certain implementations, at least one x-ray diffractor 30 is of the single crystal type (e.g., to provide higher energy resolution), at least one x-ray diffractor 30 is of the mosaic crystal type (e.g., to provide lower energy resolution), and/or the plurality of x-ray diffractors 30 comprises both at least one single crystal type and at least one mosaic crystal type. In certain implementations, at least two x-ray diffractors 30 (e.g., each x-ray diffractor 30) comprise the same material and diffraction planes (e.g., reflection or Miller indices) and are configured to diffract x-rays with an energy overlap with one another less than 10% (e.g., less than 2%; less than 0.1%). In certain other implementations, at least two x-ray diffractors 30 (e.g., each x-ray diffractor 30) comprise different materials and/or different diffraction planes (e.g., Miller indices). In certain implementations, the x-rays 22 diffracted by the first x-ray diffractor 30a have a first energy and the x-rays 22 diffracted by the second x-ray diffractor 30b have a second energy different from the first energy by at least 1 eV (e.g., by at least 2 eV; by at least 5 eV; by at least 15 eV; by at least 30 eV).

Table 1 lists example crystalline materials and diffraction planes and corresponding diffracted x-ray energy ranges in accordance with certain implementations described herein. In certain implementations, the at least one crystalline material and the diffraction planes (e.g., Miller indices) are configured to provide an optimum tradeoff between throughput and spectral resolution. In certain implementations, the diffraction planes (e.g., Miller indices) are configured to reduce (e.g., minimize; eliminate) background contributions arising from higher order reflections of high energy x-rays. The existence of these higher energy x-rays in the polychromatic x-rays 22 incident on the x-ray diffractors 30 can be dependent upon the choice and the design of the x-ray collimator 20.

TABLE 1

| Crystal (Miller indices) | Energy Range | Energy Resolution | Reflection Intensity |
| --- | --- | --- | --- |
| Quartz (01-10) | 1.7 keV-3 keV | high | moderate |
| LiF(200) | | high | high |
| LiF(220) | | high | high |
| Si(111) | 2.5 keV-7.5 keV | moderate | high |
| Si(220) | 4 keV-12 keV | high | high |
| Si(400) | 5.6 keV-17 keV | high | high |
| Si(311) | 4.7 keV-13.2 keV | high | high |
| Si(331) | 6.5 keV-18 keV | high | high |
| Si(620) | 9 keV-26 keV | high | moderate |
| Ge(111) | 2.4 keV-7 keV | moderate | high |
| Ge(220) | 3.8 keV-11.8 keV | moderate | high |
| Ge(400) | 5.4 keV-16.5 keV | moderate | high |
| Ge(311) | 4.5 keV-14 keV | moderate | moderate |
| Ge(331) | 6 keV-18 keV | moderate | moderate |
| Ge(620) | 8.6 keV-26.5 keV | moderate | moderate |
| HOPG(002) | 3 keV-9 keV | moderate | moderate |

The at least one x-ray diffractor 30 (e.g., the most upstream x-ray diffractor 30) can have an x-ray transmittance greater than 2% (e.g., greater than 5%). The at least one x-ray diffractor 30 can be sufficiently thin to provide the x-ray transmittance. For example, the at least one x-ray diffractor 30 can have a thickness (e.g., in a direction along which the x-rays 22 received by the x-ray diffractor 30 are propagating) less than 500 microns (e.g., less than 200 microns; less than 100 microns; less than 50 microns; less than 20 microns; less than 10 microns; less than 5 microns). The at least one crystalline material can be held by a support structure configured to provide mechanical strength while not affecting the x-ray transmission of the x-ray diffractor 30. The thickness of the at least one x-ray diffractor 30 can be selected to provide an optimum tradeoff between diffraction efficiency and transmission (e.g., to increase or maximize throughput). For example, the thickness of the at least one crystalline material can vary between about 1.5× to 5× the primary extinction thickness of x-rays in the crystalline material (e.g., for a primary extinction thickness of 2.5 microns, the thickness of the crystalline material can range from about 3.5 microns to 12.5 microns). The diffraction efficiency can be in a range of about 37% to about 99% of the maximum theoretical diffraction efficiency and the x-ray transmission can be greater than 2% (e.g., in a range of 2% to 95%).

In certain implementations, the x-ray diffractors 30 are asymmetrically cut either to increase the energy bandwidth for higher flux of the diffracted x-rays 22 or to decrease the energy bandwidth for higher energy resolution. In certain implementations, at least one of the x-ray diffractors 30 diffracts x-rays 22 having different energies over the crystal surface (e.g., imperfect crystal) and the corresponding x-ray detector 40 comprises a pixel array detector to record the diffracted x-rays 22 in response to the different positions on the x-ray diffractor 30. In certain implementations, the diffraction planes of at least one x-ray diffractor 30 are substantially parallel to the crystal surface of the at least one x-ray diffractor 30, while in certain other implementations, the diffraction planes of at least one x-ray diffractor 30 are not substantially parallel to the crystal surface of the at least one x-ray diffractor 30.

In certain implementations, at least one x-ray diffractor 30 of the plurality of x-ray diffractors 30 is substantially flat (see, e.g., FIGS. 1A, 1B, 2A, 4, and 5), while in certain other implementations, at least one x-ray diffractor 30 is curved (e.g., spherically bent; cylindrically bent) in one direction or two directions (see, e.g., FIGS. 3, 4, 5, and 6).

In certain implementations, at least one x-ray diffractor 30 of the plurality of x-ray diffractors 30 comprises a multi-layer.

The plurality of x-ray diffractors 30 can comprise at least one single crystal, at least one mosaic crystal, and/or at least one multilayer. For example, symmetric single crystals, asymmetric single crystals, mosaic crystals, and multilayers can be mixed and matched to provide predetermined energy resolutions and throughput.

In certain implementations, at least one x-ray diffractor 30 of the plurality of x-ray diffractors 30 (e.g., each x-ray diffractor 30) is configured to diffract x-rays 22 having predetermined energies (e.g., characteristic x-ray energies or x-ray spectral lines corresponding to one or more atomic elements of interest; energies of background contributions near the characteristic x-ray energies or x-ray spectral lines). In certain implementations, at least one x-ray diffractor 30 (e.g., each x-ray diffractor 30) is configured to diffract x-rays 22 with an energy resolution better than 50 eV (e.g., better than 25 eV; better than 10 eV; better than 5 eV; better than 2 eV better than 1 eV) and/or within a spectral bandwidth greater than 10 eV (e.g., greater than 25 eV; greater than 50 eV; greater than 100 eV; greater than 200 eV; greater than 1 keV). The spectral bandwidth of an x-ray diffractor 30 can include one or more characteristic x-ray energies or x-ray spectral lines corresponding to one or more atomic elements of interest, energies of background contributions near the characteristic x-ray energies or x-ray spectral lines, or no x-ray spectral lines. In certain implementations, at least one x-ray diffractor 30 (e.g., the most downstream x-ray diffractor 30) has a larger spectral bandwidth (e.g., coarser energy resolution) than does at least one other x-ray diffractor 30 (e.g., the most upstream x-ray diffractor 30). In certain implementations, the spectral overlap of x-rays 22 diffracted by at least two x-ray diffractors 30 is less than 50% (e.g., less than 25%; less than 10%; less than 5%; no spectral overlap). In certain other implementations, the spectral overlap of x-rays 22 diffracted by at least two x-ray diffractors 30 is greater than 5% (e.g., greater than 10%; greater than 25%). The diffracted energies, energy bandwidths, and spectral overlaps of the x-ray diffractors 30 can be selected based on the specific spectroscopy measurements to be made.

In certain implementations, each x-ray diffractor 30 of the plurality of x-ray diffractors 30 has substantially the same energy resolution as one another. In certain other implementations, the most upstream x-ray diffractor 30 (e.g., the first x-ray diffractor 30a) has the highest energy resolution of all the x-ray diffractors 30 (e.g., to be able to analyze fine features in the pre-edge of the absorption spectrum of the sample, such as $TiO_2$ or rutile) and the other at least one x-ray diffractor 30 either have substantially the same energy resolution as one another or have substantially different energy resolutions as one another.

In certain implementations, the most upstream x-ray diffractor 30 (e.g., the first x-ray diffractor 30a) is configured to diffract x-rays having the weakest intensity (e.g., signal) of the spectrum to be measured. For example, the most upstream x-ray diffractor 30 can be configured to diffract characteristic x-rays of a trace atomic element of the source 5 (e.g., sample under analysis) which have low signal strength, while the other x-ray diffractors 30 (e.g., the second x-ray diffractor 30b and/or the third x-ray diffractor 30c) can be configured to diffract characteristic x-rays of other atomic elements (e.g., major atomic elements; minor atomic elements) of the source 5 having stronger x-ray signals.

In certain implementations, the most downstream x-ray diffractor 30 of the plurality of x-ray diffractors 30 (e.g., the third x-ray diffractor 30c of FIGS. 1A and 1B; the second x-ray diffractor 30b of FIGS. 2A, 3, 4, 5, and 6) is not substantially transmissive to the x-rays 22. In certain implementations, the most downstream x-ray diffractor 30 has a larger spectral bandwidth than does at least one other x-ray diffractor 30 of the plurality of x-ray diffractors 30 (e.g., each other x-ray diffractor 30) to increase the x-ray signal detected. For example, the most downstream x-ray diffractor 30 can comprise a multilayer while the at least one other x-ray diffractor 30 comprises a thin crystalline material.

Motion Stage

In certain implementations, the apparatus 10 further comprises at least one motion stage configured to move at least one x-ray diffractor 30 of the plurality of x-ray diffractors 30 (e.g., each x-ray diffractor 30) to adjust an incident angle of the x-rays 22 to the at least one x-ray diffractor 30. For example, a first motion stage (e.g., rotational motion stage; linear motion stage) can be configured to move the first x-ray diffractor 30a relative to the x-ray propagation direction 24 (e.g., to adjust the first Bragg angle $\theta_1$), a second motion stage (e.g., rotational motion stage; linear motion stage) can be configured to move the second x-ray diffractor 30b relative to the x-ray propagation direction 24 (e.g., to adjust the second Bragg angle $\theta_2$), and/or a third motion stage (e.g., rotational motion stage; linear motion stage) can be configured to move the third x-ray diffractor 30c relative to the x-ray propagation direction 24 (e.g., to adjust the third Bragg angle $\theta_3$). The motion of the first, second, and third x-ray diffractors 30a,b,c are denoted in FIGS. 1A and 1B by curved double-headed arrows. The example apparatus 10 of FIGS. 1A and 1B comprise at least one motion stage, and the example apparatus 10 of FIGS. 2A, 3, 4, 5, and 6 can also comprise at least one motion stage. While FIGS. 1A and 1B schematically illustrate an example apparatus 10 in which each of the x-ray diffractors 30 is moved by the at least one motion stage, in certain other implementations, at least one of the x-ray diffractors 30 is fixed relative to the x-ray propagation direction 24.

In certain implementations, the at least one motion stage is configured to vary the at least one Bragg angle of a corresponding at least one x-ray diffractor 30 (e.g., at least one of the first, second, and third Bragg angles $\theta_1$, $\theta_2$, $\theta_3$) over a predetermined angular range (e.g., an angular range 0.1 degree wide, 1 degree wide, 5 degree wide, or 50 degrees wide). In certain implementations, at least some of the motion stages are configured to vary the Bragg angles of the corresponding x-ray diffractors 30 simultaneously (e.g., by the same angular amount; by differing angular amounts). In certain implementations, the at least one motion stage is configured to hold at least two x-ray diffractors 30 at a predetermined angle relative to one another (e.g., the angle between the diffraction planes of the first and second x-ray diffractors 30a,b greater than 0.1 mrad). In certain other implementations, the at least one motion stage is configured to adjust (e.g., rotate) the angles of at least two x-ray diffractors 30 relative to each other and/or to the x-ray propagation direction 24. For example, the x-ray diffractors 30 can be rotated at the same angular speed (e.g., rotated simultaneously by the same angular increment) or by different angular speeds (e.g., rotated simultaneously by different angular increments). In certain implementations, at least one x-ray diffractor 30 is configured to be rotated while the corresponding x-ray detector 40 remains fixed, while in certain other implementations, at least one x-ray diffractor 30 and the corresponding x-ray detector 40 are configured to be moved in tandem with one another (e.g., the x-ray detector 40 is moved in accordance with the rotation of the x-ray diffractor 30 to ensure detection of the diffracted spectral band of x-rays).

By changing at least one Bragg angle of a corresponding at least one x-ray diffractor 30, the x-ray energy diffracted by the x-ray diffractor 30 to the corresponding x-ray detector 40 is changed. In certain implementations, during a spectral measurement, each x-ray diffractor 30 remains stationary and is configured (e.g., optimized) to diffract a predetermined x-ray energy or over a predetermined spectral bandwidth (e.g., each x-ray diffractor 30 configured to diffract one or more corresponding characteristic x-ray spectral lines of one or more corresponding atomic elements), thereby providing simultaneous measurements of multiple characteristic x-ray spectral lines (e.g., of multiple atomic elements). In certain other implementations, during a spectral measurement, at least one x-ray diffractor 30 remains stationary and is configured to diffract a predetermined x-ray energy, while at least one other Bragg angle of at least one other x-ray diffractor 30 is changed to diffract x-rays having other predetermined discrete x-ray energies or having a predetermined range of x-ray energies (e.g., to cover other predetermined spectral bandwidths).

X-Ray Detectors

Examples of x-ray detectors 40 compatible with certain implementations described herein include, but are not limited to: ionization chambers; proportional counters; scintillation counters; pindiodes; silicon drift detectors (SDDs); pixels of a pixel array detector (e.g., charge coupled device (CCD) detector; complementary metal-oxide semiconductor (CMOS) detector; photon counting detector). In certain implementations, the plurality of x-ray detectors 40 comprises at least one x-ray detector 40 having an energy resolution better than 25% (e.g., better than 5%) of the energies of the detected x-rays.

In certain implementations, at least one x-ray detector 40 of the plurality of x-ray detectors 40 comprises a pixel array detector extending in at least one dimension and is used with a corresponding x-ray diffractor 30 comprising at least one crystalline material in which the x-ray diffractor 30 is not substantially flat (e.g., warped). At least one x-ray detector 40 can be pixelated (e.g., comprising pixels having a pixel size in a range of 3 microns to 200 microns in the dispersion direction and in a range of 3 microns to 5000 microns in a sagittal direction) or can comprise a strip detector or a two-dimensional detector. At least one x-ray detector 40 can comprise a direct-conversion solid state x-ray detector (e.g., pixelated photon counting detector; CCD detector; CMOS detector). At least one x-ray detector 40 can comprise multiple SDD detectors stacked with one another.

In certain implementations, at least one x-ray detector 40 of the plurality of x-ray detectors 40 comprises a photon counting pixel array detector having at least one energy threshold configured to reject x-rays (e.g., remove detection) with energies below the at least one energy threshold and/or to reject x-rays (e.g., remove detection) with energies above the at least one energy threshold. For example, the x-ray detector 40 can be configured to reject higher harmonics (e.g., multiples) or lower harmonics (e.g., multiples) of the measured energy being recorded by the x-ray detector 40. For example, the photon counting pixel array detector can have at least two energy thresholds configured to define an energy window between the two energy thresholds (e.g., the energy window at least 1 keV in width) such that x-rays below and above the energy window are not detected. The energy thresholds can be preset to several keV (e.g., in a range of 3 keV to 8 keV; in a range of 1 keV to 3 keV) or sub-keV (e.g., an SDD with an energy window on the order of 100 eV to 250 eV).

By reducing (e.g., eliminating) higher order harmonics, certain implementations can reduce (e.g., eliminate) background contributions in the absorption spectra, significantly increasing the throughput of the apparatus 10. For example, eliminating a 10% background contribution arising from higher order harmonics in the spectrum can increase the throughput of the apparatus 10 by about 3× for XAS measurements. Eliminating higher energy x-rays can also allow the source of ionizing radiation (e.g., to generate the x-rays in the x-ray source 5) to be operated at higher fluxes (e.g., higher voltages) for higher throughput.

In certain implementations in which at least one x-ray detector 40 comprises a pixelated detector, the pixelated detector can comprise a one-dimensional or two-dimensional array of pixels. The pixelated detector can have a long dimension in a range of 30 mm to 50 mm, a range of 30 mm to 100 mm, in a range of 100 mm to 300 mm, or in a range above 300 mm. For a one-dimensional array of pixels, the detector can be oriented such that the long dimension of the array is along the dispersion plane. The pixel sizes can be sufficiently large (e.g., on the order of 0.5 mm to 10 mm) to accept the diffracted x-ray beam in the dispersion plane. In the sagittal plane (e.g., substantially perpendicular to the dispersion plane), the diffracted x-ray beam can be detected by a plurality of pixels, each pixel independent from adjacent pixels and configured to detect a corresponding portion of the diffracted x-ray beam. For a two-dimensional array detector, the detector can be used to record diffracted x-rays from different areas of the corresponding x-ray diffractor 30 (e.g., different areas of the substantially flat crystal with crystal planes varying across the crystal) which can allow simultaneous detection of a range of x-ray energies.

In certain implementations, the apparatus 10 further comprises at least one motion stage configured to move at least one x-ray detector 40 of the plurality of x-ray detectors 40 (e.g., each x-ray detector 40) such that the diffracted x-rays from the corresponding x-ray diffractor 30 are received by the x-ray detector 40. For example, a first motion stage (e.g., rotational motion stage; linear motion stage) can be configured to move the first x-ray detector 40a, a second motion stage (e.g., rotational motion stage; linear motion stage) can be configured to move the second x-ray detector 40b, and/or a third motion stage (e.g., rotational motion stage; linear motion stage) can be configured to move the third x-ray detector 40c.

In certain implementations, at least some of the motion stages are configured to move the corresponding x-ray detectors 40 simultaneously. For example, the x-ray detectors 40 can be moved at the same linear or angular speed or by different linear or angular speeds. In certain implementations, at least one x-ray detector 40 and the corresponding at least one x-ray diffractor 30 are configured to be moved in tandem with one another (e.g., the x-ray detector 40 is moved in accordance with the rotation of the x-ray diffractor 30 to ensure detection of the diffracted spectral band of x-rays).

Example Apparatus

FIGS. 1A and 1B schematically illustrate two example apparatus 10 comprising a plurality of substantially flat x-ray diffractors 30 and a plurality of x-ray detectors 40 in accordance with certain implementations described herein. The x-ray diffractors 30 are configured to receive substantially collimated x-rays 22 and are positioned sequentially along an x-ray beam propagating direction 24. As shown in FIG. 1A, each x-ray diffractor 30 comprises a substantially flat crystal and each x-ray detector 40 comprises at least one active element 42 configured to directly receive a diffracted spectral band of the x-rays 22 from a corresponding x-ray diffractor 30. As shown in FIG. 1B, the first and second x-ray diffractors 30a,b are substantially flat channel cut crystals and the third x-ray diffractor 30c is a substantially flat crystal. Each of at least one of the x-ray detectors 40 comprises at least one active element 42 and the first and second x-ray detectors 40a,b each comprises at least one reflective x-ray optic 44a,b (e.g., x-ray mirror), the at least one reflective x-ray optic 44a,b configured to directly receive a diffracted spectral band of the x-rays 22 from a corresponding x-ray diffractor 30a,b and to reflect at least a portion of the diffracted spectral band of the x-rays 22 to the corresponding at least one active element 42a,b. In certain implementations, as shown in FIG. 1B, the third x-ray detector 40c does not comprise at least one reflective x-ray optic, while in certain other implementations, the third x-ray detector 40c does comprise at least one reflective x-ray optic.

Figure 2A:
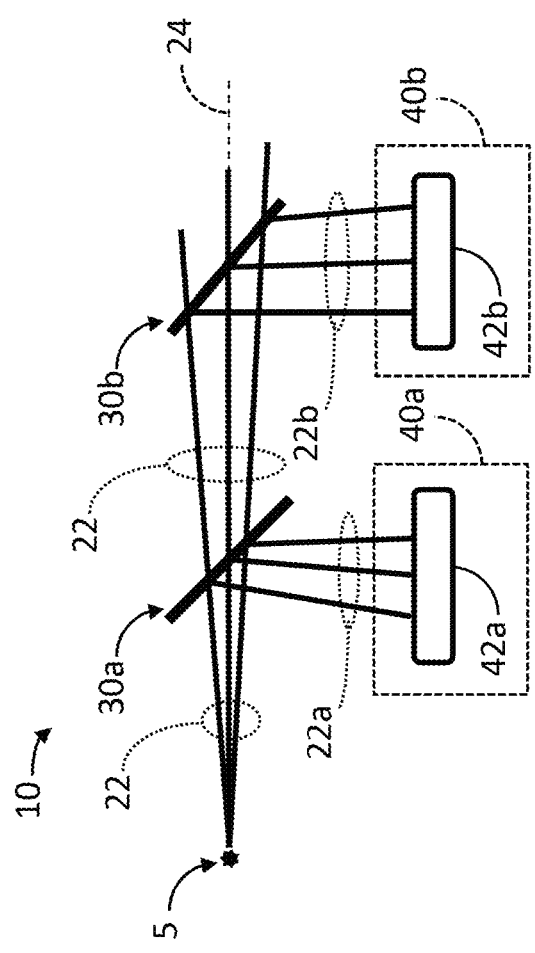
FIG. 2A schematically illustrates another example apparatus comprising a plurality of substantially flat x-ray diffractors and a plurality of x-ray detectors in accordance with certain implementations described herein.

FIG. 2A schematically illustrates an example apparatus 10 comprising a plurality of substantially flat x-ray diffractors 30 and a plurality of x-ray detectors 40 in accordance with certain implementations described herein. The x-ray diffractors 30 are configured to receive diverging x-rays 22 (e.g., from an x-ray source 5 extending less than 100 Microns along the dispersion plane) and are positioned sequentially along an x-ray beam propagating direction 24. Each of the first and second x-ray detectors 40a,b can comprise at least one active element 42a,b (e.g., pixel array detector) and is configured to detect a corresponding diffracted spectral band of the x-rays 22 from the corresponding x-ray diffractor 30a,b. The angle between the diffraction planes of the two x-ray diffractors 30 can be greater than 0.1 mrad.

Figure 3:
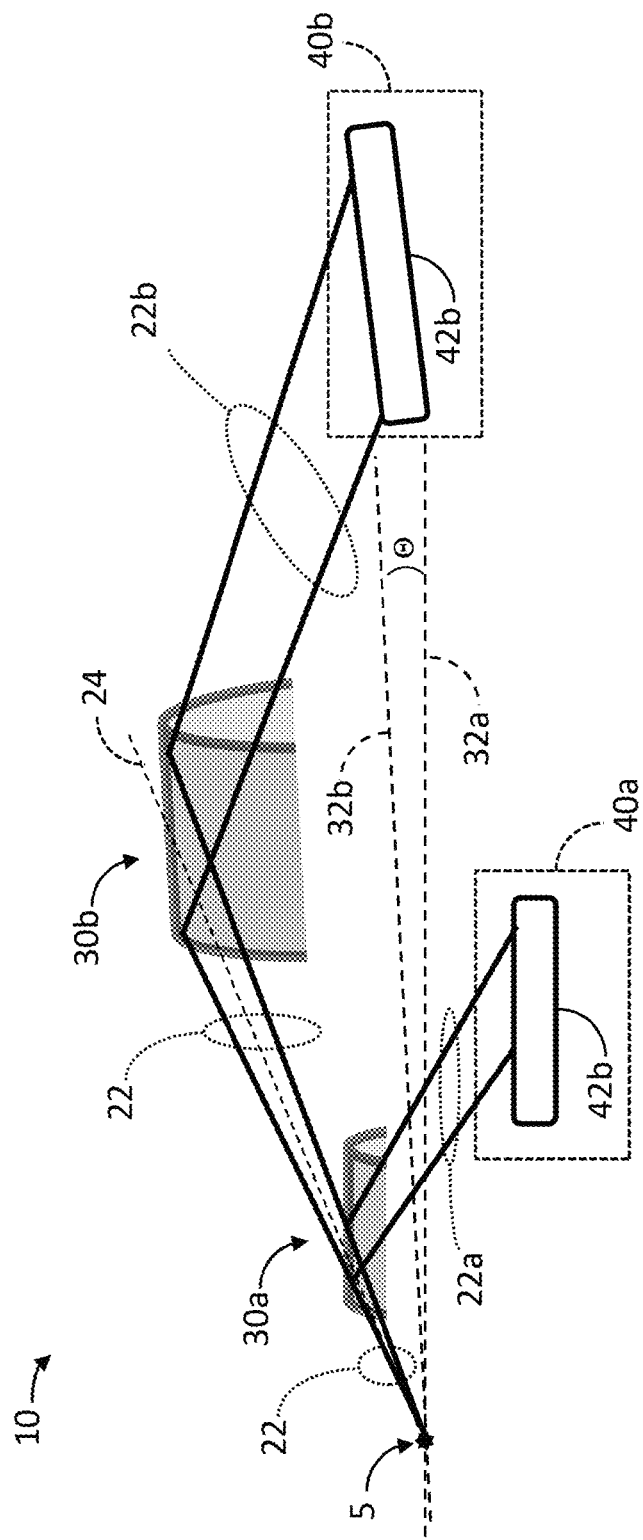
FIG. 3 schematically illustrates an example apparatus comprising a plurality of curved x-ray diffractors and a plurality of x-ray detectors in accordance with certain implementations described herein.

FIG. 3 schematically illustrates an example apparatus 10 comprising a plurality of curved (e.g., in at least one direction; spherically bent; cylindrically bent) x-ray diffractors 30 and a plurality of x-ray detectors 40 in accordance with certain implementations described herein. The x-ray diffractors 30 are configured to receive diverging x-rays 22 and are positioned sequentially along an x-ray beam propagating direction 24. The x-ray diffractors 30 comprise a first x-ray diffractor 30a comprising a first von Hamos crystal having a corresponding first longitudinal axis 32a and a second x-ray diffractor 30b comprising a second von Hamos crystal having a corresponding second longitudinal axis 32b at a non-zero angle $\Theta$ (e.g., greater than 0.1 mrad) relative to the first longitudinal axis 30a. In certain implementations, the non-zero angle $\Theta$ is fixed to a predetermined value (e.g., in a range of 0.1 mrad to 0.5 radian) during a spectral measurement, while in certain other implementations, the non-zero angle Θ is varied during a spectral measurement. While FIG. 3 shows two x-ray diffractors 30 each comprising a von Hamos crystal, certain other implementations can comprise additional x-ray diffractors 30 each comprising a von Hamos crystal. At least one of the x-ray detectors 40 comprises a pixel array detector configured to detect a diffracted spectral band of the x-rays 22 diffracted by a corresponding x-ray diffractor 30 (e.g., von Hamos crystal). In certain implementations, the von Hamos crystal of the most upstream x-ray diffractor 30 (e.g., the first x-ray diffractor 30a) has an x-ray transmittance of at least 2% (e.g., at least 5%) and the von Hamos crystal of the most downstream x-ray diffractor 30 (e.g., the second x-ray diffractor 30b) has an x-ray transmittance less than 5% (e.g., less than 2%). The apparatus 10 of FIG. 3 can be considered to comprise a first von Hamos WDS and one or more second von Hamos WDSs positioned sequentially downstream from the first von Hamos WDS, each second von Hamos WDS configured to intercept at least a portion of the x-rays 22 transmitted through the first von Hamos WDS and any other upstream von Hamos WDSs. In certain implementations, at least one von Hamos WDS is configured to intercept at least a portion of the x-rays 22 intercepted and transmitted through another at least one von Hamos WDS (see, e.g., FIG. 3), while in certain other implementations, at least one von Hamos WDS is configured to intercept at least a portion of x-rays not intercepted by another at least one von Hamos WDS.

Figure 4:
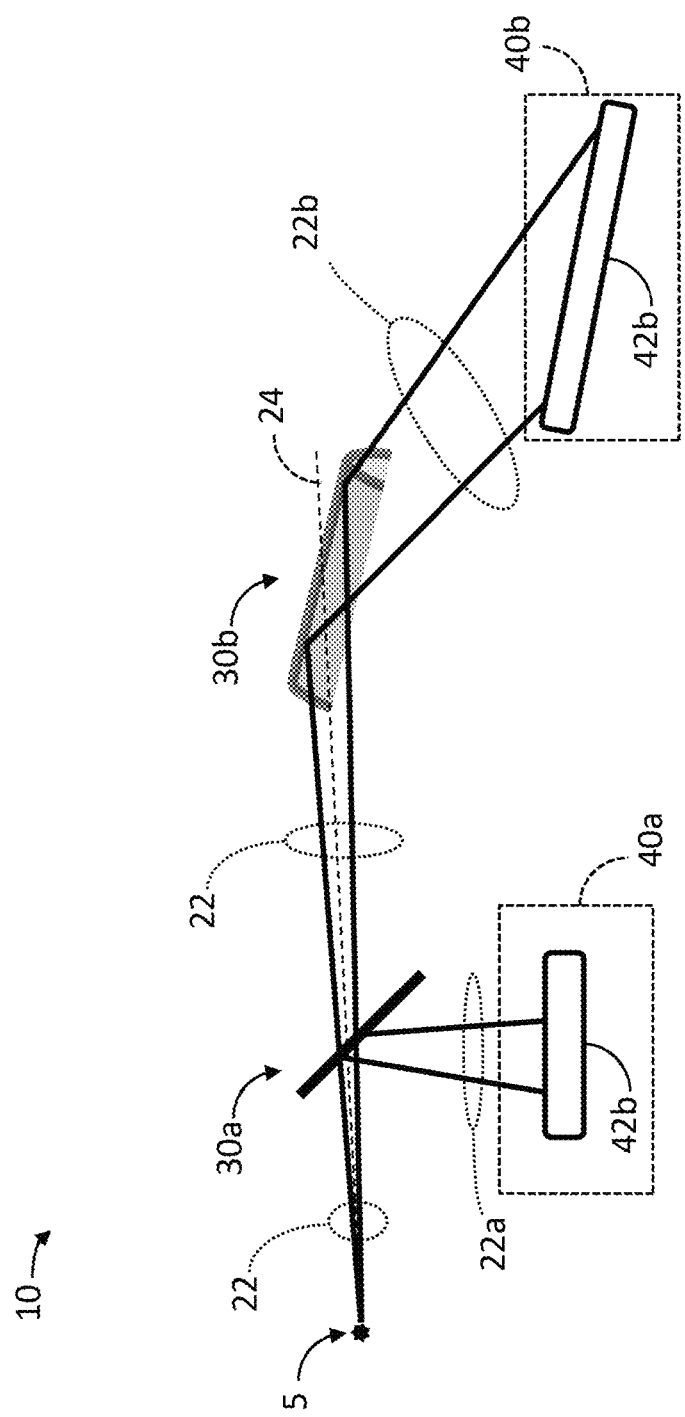
FIG. 4 schematically illustrates an example apparatus comprising at least one substantially flat x-ray diffractor, at least one substantially curved x-ray diffractor, and a plurality of x-ray detectors in accordance with certain implementations described herein.

FIG. 4 schematically illustrates an example apparatus 10 comprising at least one substantially flat x-ray diffractor 30, at least one substantially curved (e.g., in at least one direction; spherically bent; cylindrically bent) x-ray diffractor 30, and a plurality of x-ray detectors 40 in accordance with certain implementations described herein. The x-ray diffractors 30 are configured to receive diverging x-rays 22 and are positioned sequentially along an x-ray beam propagating direction 24. As shown in FIG. 4, the first x-ray diffractor 30a comprises a substantially flat crystal having an x-ray transmittance of at least 2% (e.g., at least 5%) and the second x-ray diffractor 30b comprises a von Hamos crystal downstream from the first x-ray diffractor 30a. At least one of the x-ray detectors 40 comprises a pixel array detector configured to detect a diffracted spectral band of the x-rays 22 diffracted by a corresponding x-ray diffractor 30.

Figure 5:
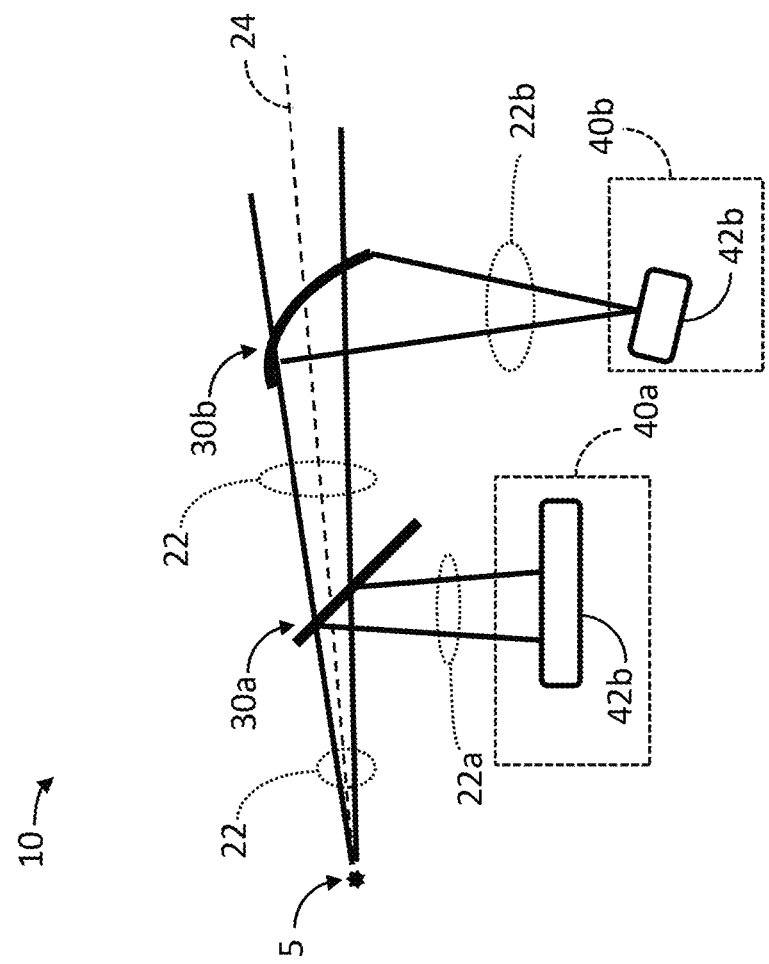
FIG. 5 schematically illustrates another example apparatus comprising at least one substantially flat x-ray diffractor, at least one substantially curved x-ray diffractor, and a plurality of x-ray detectors in accordance with certain implementations described herein.

FIG. 5 schematically illustrates another example apparatus 10 comprising at least one substantially flat x-ray diffractor 30, at least one substantially curved (e.g., in at least one direction; spherically bent; cylindrically bent) x-ray diffractor 30, and a plurality of x-ray detectors 40 in accordance with certain implementations described herein. The x-ray diffractors 30 are configured to receive diverging x-rays 22 and are positioned sequentially along an x-ray beam propagating direction 24. As shown in FIG. 5, the first x-ray diffractor 30a comprises a substantially flat crystal having an x-ray transmittance of at least 2% (e.g., at least 5%) and the second x-ray diffractor 30b comprises a spherically or cylindrically bent crystal (e.g., Johann crystal; Johannsson crystal) downstream from the first x-ray diffractor 30a. At least one of the x-ray detectors 40 comprises a pixel array detector configured to detect a diffracted spectral band of the x-rays 22 diffracted by a corresponding x-ray diffractor 30. In certain implementations, the x-ray source 5, the second x-ray diffractor 30b, and the second x-ray detector 40b (e.g., comprising a single active element 42b (e.g., pixel; detector element)) are configured in a Rowland circle geometry. In certain other implementations, the x-ray source 5, the second x-ray diffractor 30b, and the second x-ray detector 40b are configured in an off-Rowland circle geometry with the x-ray source 5 inside the Rowland circle while the second x-ray diffractor 30b and the second x-ray detector 40b are on the Rowland circle, and the second x-ray detector 40b comprises a pixel array detector.

Figure 6:
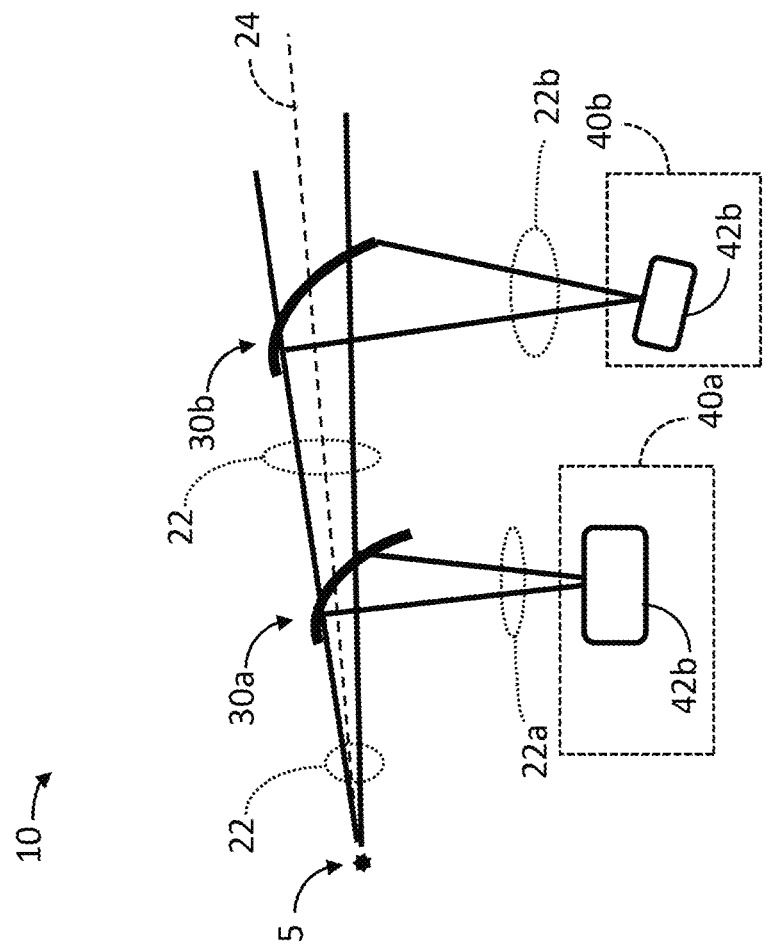
FIG. 6 schematically illustrates another example apparatus comprising a plurality of curved x-ray diffractors and a plurality of x-ray detectors in accordance with certain implementations described herein.

FIG. 6 schematically illustrates another example apparatus 10 comprising a plurality of curved (e.g., in at least one direction; spherically bent; cylindrically bent) x-ray diffractors 30 and a plurality of x-ray detectors 40 in accordance with certain implementations described herein. The x-ray diffractors 30 are configured to receive diverging x-rays 22 and are positioned sequentially along an x-ray beam propagating direction 24. As shown in FIG. 6, the x-ray diffractors 30 comprise a first x-ray diffractor 30a comprising a spherically or cylindrically bent first crystal (e.g., Johann crystal; Johannsson crystal) having an x-ray transmittance of at least 2% (e.g., at least 5%) and a second x-ray diffractor 30b comprising a spherically or cylindrically bent first crystal (e.g., Johann crystal; Johannsson crystal) downstream from the first x-ray diffractor 30a. At least one of the x-ray detectors 40 comprises a pixel array detector configured to detect a diffracted spectral band of the x-rays 22 diffracted by a corresponding x-ray diffractor 30. In certain implementations, the x-ray source 5, the first x-ray diffractor 30a, and the first x-ray detector 40a are configured in a first Rowland circle geometry and the x-ray source 5, the second x-ray diffractor 30b, and the second x-ray detector 40b are configured in a second Rowland circle geometry.

Example XAS, XES, and XRF Methods

In certain implementations, the apparatus 10 is configured to perform x-ray absorption spectroscopy (XAS) and/or x-ray emission spectroscopy (XES) of various materials (e.g., catalysts in fuel cells; semiconductor quantum structures; magnetic semiconductor structures, nanotechnology, materials for energy storage and conversion). For example, XAS measurements can be made by detecting x-ray absorption as a function of x-ray energy over an absorption edge of an atomic element with sufficient energy resolution (e.g., less than 2 eV or less than 1 eV for detecting x-ray absorption near edge structure (XANES) indicative of chemical states such as oxidation states; less than 10 eV or less than 5 eV for detecting extended x-ray absorption fine structure (EXAFS) indicative of interatomic distances and coordination numbers). For another example, XES measurements can be made by detecting x-ray emission as a function of x-ray energy with sufficient energy resolution (e.g., less than 2 eV) to determine chemical states such as oxidation states.

In certain implementations, the apparatus 10 is configured to perform x-ray fluorescence (XRF) spectroscopy in various applications (e.g., metallurgy, geology and mining, semiconductor metrology, failure analysis, electronics, archaeology, and environmental analysis). For example, XRF measurements can be made by detecting the number of characteristic x-rays emitted by atomic elements in a material (e.g., solids; liquids; powders) and in many circumstances the XRF measurements are made non-destructively.

Conventional XAS, XES, and/or XRF systems using a crystal-based spectrometer to provide sufficient energy resolution are limited in throughput because only a narrow energy bandwidth of x-rays incident on a point on a crystal that satisfy the Bragg law are reflected while x-rays outside the narrow energy bandwidth are lost or wasted (e.g., absorbed by the crystal), resulting in a reduction of the signals contained in the absorbed x-rays. In contrast, using an apparatus 10 in accordance with certain implementations described herein can make efficient use of x-rays of wider energy bandwidth simultaneously and can increase the data collection speed.

In certain implementations, for XANES measurements, at least one of the x-ray diffractors 30 has an energy bandwidth better than 3 eV (e.g., better than 2 eV; better than 1 eV) but the maximum central energy difference is less than 50 eV (e.g., less than 20 eV; less than 10 eV). In certain implementations, the difference between the mean energies of the different x-ray diffractors 30 are between 2 eV and 10 eV or up to 250 eV. To obtain XANES measurements over an energy range (e.g., 30 eV to 100 eV), the x-ray diffractors 30 can be rotated and the x-rays diffracted by each x-ray diffractor 30 can be recorded. The spectra recorded by all the x-ray diffractor 30/x-ray detector 40 pairs can be normalized to yield a single spectrum.

In certain implementations, for EXAFS measurements, at least one x-ray diffractor 30 has an energy spectral resolution better than 50 eV (e.g., better than 10 eV; better than 5 eV; better than 2 eV) and the central energies of the x-ray diffractors 30 differ by more than 1 eV (e.g., more than 2 eV; more than 5 eV; more than 10 eV) but the maximum central energy difference is less than 100 eV (e.g., less than 500 eV). In certain implementations, the difference between the central energies of the different x-ray diffractors 30 is in a range of 5 eV to 50 eV. To obtain EXAFS measurements over an energy range (e.g., 400 eV to 1000 eV), the x-ray diffractors 30 can be rotated and the x-rays diffracted by each x-ray diffractor 30 can be recorded. The spectra recorded by all the x-ray diffractor 30/x-ray detector 40 pairs can be normalized to yield a single spectrum.

In certain implementations, for XES measurements, at least one of the x-ray diffractors 30 has an energy bandwidth better than 3 eV (e.g., better than 2 eV; better than 1 eV) and the central energies of the x-ray diffractors 30 differ by more than 1 eV (e.g., more than 2 eV; more than 3 eV; more than 10 eV) but the maximum central energy difference is less than 50 eV. In certain implementations, the difference between the central energies of the different x-ray diffractors 30 is in a range of 2 eV to 50 eV (e.g., a range of 2 eV to 10 eV). In certain implementations, different x-ray diffractors 30 are configured to measure different characteristic x-ray emission lines (e.g., Kα and Kβ x-ray spectral lines). For example, at least one upstream x-ray diffractor 30 can be configured to diffract a first characteristic x-ray spectral line of lower fluorescence yield (e.g., KO x-ray spectral line or one of its satellite spectral lines), and the x-ray diffractors 30 can be rotated and the x-rays diffracted by each x-ray diffractor 30 can be recorded. The spectra recorded by all the x-ray diffractor 30/x-ray detector 40 pairs can be normalized to yield a single spectrum.

In certain implementations, for XRF measurements, the apparatus 10 can make efficient use of x-rays of wider energy bandwidth simultaneously and can increase the data collection speed. In certain implementations, the x-rays are produced by a primary x-ray beam or charged particles incident on the sample under analysis. In certain implementations, at least one of x-ray diffractors 30 has an energy resolution better than 50 eV (e.g., better than 25 eV; better than 10 eV). In certain implementations, the difference between the mean energies of the different x-ray diffractors 30 is larger than 10 eV (e.g., larger than 25 eV; larger than 50 eV; larger than 500 eV). In certain implementations, different x-ray diffractors 30 are configured for measuring characteristic x-ray emission lines of different atomic elements (e.g., Ca and Cu x-ray spectral lines). In certain implementations, at least one upstream x-ray diffractor 30 is configured to diffract characteristic x-rays of an atomic element of low concentration or low fluorescence signal. In certain implementations, at least one upstream x-ray diffractor 30 is configured to diffract characteristic x-rays of an atomic element of interest and at least one another x-ray diffractor 30 is configured to diffract x-rays having energies close to the characteristic x-ray spectral line (e.g., to improve analysis accuracy of the atomic element). The x-ray diffractors 30 can be rotated, and the x-rays diffracted by each x-ray diffractor 30 can be recorded. The spectra recorded by all the x-ray diffractor 30/x-ray detector 40 pairs can be normalized to yield a measure of the atomic composition of a material.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus configured to receive x-rays propagating from an x-ray source along an x-ray propagation direction, the apparatus comprising:
    a plurality of x-ray diffractors along the x-ray propagation direction, the plurality of x-ray diffractors comprising at least a first x-ray diffractor and a second x-ray diffractor, the second x-ray diffractor downstream from the first x-ray diffractor; and
    a plurality of x-ray detectors comprising at least a first x-ray detector and a second x-ray detector,
    the first x-ray diffractor configured to receive the x-rays, to diffract a first spectral band of the x-rays to the first x-ray detector, and to transmit at least 2% of the received x-rays to the second x-ray diffractor,
    the second x-ray diffractor configured to receive the transmitted x-rays from the first x-ray diffractor and to diffract a second spectral band of the x-rays to the second x-ray detector,
    the first x-ray detector comprising at least one first active element configured to measure a first spectrum of at least a portion of the first spectral band of the x-rays and the second x-ray detector comprising at least one second active element configured to measure a second spectrum of at least a portion of the second spectral band of the x-rays.

2. The apparatus of claim 1, wherein the plurality of x-ray diffractors are arranged sequentially along the x-ray propagation direction.

3. The apparatus of claim 1, wherein the plurality of x-ray diffractors further comprise a third x-ray diffractor and the plurality of x-ray detectors further comprises a third x-ray detector, the third x-ray diffractor downstream from the second x-ray diffractor, the second x-ray diffractor configured to transmit at least 2% of the x-rays received from the first x-ray diffractor to the third x-ray diffractor, the third x-ray diffractor configured to receive the transmitted x-rays from the second x-ray diffractor and to diffract a third spectral band of the x-rays to the third x-ray detector, the third x-ray detector comprising at least one third active element configured to measure a third spectrum of at least a portion of the third spectral band of the x-rays.

4. The apparatus of claim 1, further comprising an x-ray collimator configured to receive the x-rays from the x-ray source and to collimate at least some of the x-rays, the first x-ray diffractor configured to receive the collimated x-rays from the x-ray collimator.

5. The apparatus of claim 4, wherein the x-ray collimator comprises at least one mirror optic having a functional surface with at least one portion of the surface having a paraboloidal shape.

6. The apparatus of claim 4, wherein the x-ray collimator comprises a Wolter optic having a hyperboloidal segment and a paraboloidal segment configured such that a focus of the hyperboloidal segment is aligned with the x-ray source and the focus of the paraboloidal segment is aligned to another focus of the hyperboloidal segment.

7. The apparatus of claim 4, wherein the x-ray collimator comprises a polycapillary optic or a plurality of nested mirror optics.

8. The apparatus of claim 4, wherein the x-ray collimator comprises at least one Soller slit.

9. The apparatus of claim 4, wherein x-rays from the x-ray collimator are incident to the first x-ray diffractor at a first Bragg angle and the first spectral band of the x-rays diffracted by the first x-ray diffractor to the first x-ray detector have a first central x-ray energy, x-rays from the first x-ray diffractor are incident to the second x-ray diffractor at a second Bragg angle and the second spectral band of the x-rays diffracted by the second x-ray diffractor to the second x-ray detector have a second central x-ray energy, the second x-ray energy different from the first x-ray energy by at least 1 eV.

10. The apparatus of claim 9, wherein the plurality of x-ray diffractors further comprise a third x-ray diffractor and the plurality of x-ray detectors further comprises a third x-ray detector, the third x-ray diffractor configured to diffract a third spectral band of the x-rays to the third x-ray detector, the third x-ray diffractor downstream from the second x-ray diffractor, x-rays from the second x-ray diffractor incident to the third x-ray diffractor at a third Bragg angle $\theta_3$ and the third spectral band of the x-rays 22 diffracted by the third x-ray diffractor to the third x-ray detector have a third central x-ray energy $E_3$.

11. The apparatus of claim 1, wherein the x-rays received by the first x-ray diffractor are diverging.

12. The apparatus of claim 11, further comprising an aperture between the x-ray source and the first x-ray diffractor, the aperture having a width less than 100 microns in a dispersion plane of the first x-ray diffractor.

13. The apparatus of claim 1, wherein at least one x-ray diffractor of the plurality of x-ray diffractors comprises at least one crystalline material.

14. The apparatus of claim 13, wherein the at least one crystalline material is selected from the group consisting of: graphite, highly oriented pyrolytic graphite (HOPG), highly annealed pyrolytic graphite (HAPG), diamond, quartz, LiF, Si, and Ge.

15. The apparatus of claim 13, wherein at least one x-ray diffractor of the plurality of x-ray diffractors is a single crystal, at least one x-ray diffractor of the plurality of x-ray diffractors is a mosaic crystal, and/or the plurality of x-ray diffractors comprises both at least one single crystal and at least one mosaic crystal.

16. The apparatus of claim 1, wherein the first x-ray diffractor has a thickness in a direction along which the x-rays received by the first x-ray diffractor are propagating, the thickness less than 500 microns.

17. The apparatus of claim 1, wherein at least one x-ray diffractor of the plurality of x-ray diffractors is asymmetrically cut.

18. The apparatus of claim 1, wherein at least one x-ray diffractor of the plurality of x-ray diffractors is substantially flat.

19. The apparatus of claim 1, wherein at least one x-ray diffractor of the plurality of x-ray diffractors is curved in at least one direction.

20. The apparatus of claim 1, wherein the first x-ray diffractor is configured to diffract characteristic x-rays of a trace atomic element of the x-ray source, and the second x-ray diffractor is configured to diffract characteristic x-rays of other atomic elements of the x-ray source.

21. The apparatus of claim 1, wherein an x-ray diffractor of the plurality of x-ray diffractors that is downstream from all other x-ray diffractors of the plurality of x-ray diffractors is not substantially transmissive to the x-rays.

22. The apparatus of claim 1, further comprising at least one motion stage configured to move at least one x-ray diffractor of the plurality of x-ray diffractors to adjust an incident angle of the x-rays to the at least one x-ray diffractor.

23. The apparatus of claim 1, wherein at least one x-ray detector of the plurality of x-ray detectors is selected from the group consisting of: ionization chambers; proportional counters; scintillation counters; pindiodes; silicon drift detectors; pixels of a pixel array detector.

24. The apparatus of claim 1, wherein at least one x-ray detector of the plurality of x-ray detectors comprises a pixel array detector extending in at least one dimension.

25. The apparatus of claim 1, wherein at least one x-ray detector of the plurality of x-ray detectors comprises a photon counting pixel array detector having at least one energy threshold configured to reject x-rays with energies below the at least one energy threshold and/or to reject x-rays with energies above the at least one energy threshold.

26. The apparatus of claim 1, wherein each of the first and second x-ray diffractors comprises a substantially flat crystal.

27. The apparatus of claim 1, wherein the first x-ray diffractor comprises a first substantially curved crystal and the second x-ray diffractor comprises a second substantially curved crystal.

28. The apparatus of claim 27, wherein the first substantially curved crystal comprises a first von Hamos crystal having a corresponding first longitudinal axis and the second substantially curved crystal comprises a second von Hamos crystal having a corresponding second longitudinal axis at an angle greater than 0.1 mrad relative to the first longitudinal axis.

29. The apparatus of claim 27, wherein at least one of the first and second substantially curved crystals comprises a von Hamos crystal, a Johann crystal, or a Johannsson crystal.

30. The apparatus of claim 1, wherein the first x-ray diffractor comprises a substantially flat crystal and the second x-ray diffractor comprises a substantially curved crystal.

31. The apparatus of claim 30, wherein the substantially curved crystal comprises a von Hamos crystal, a Johann crystal, or a Johannsson crystal.

* * * * *

UNITED STATES PATENT AND TRADEMARK OFFICE
CERTIFICATE OF CORRECTION

PATENT NO. : 11,885,755 B2
APPLICATION NO. : 18/309021
DATED : January 30, 2024
INVENTOR(S) : Wenbing Yun et al.

Page 1 of 1

It is certified that error appears in the above-identified patent and that said Letters Patent is hereby corrected as shown below:

In the Specification

In Column 5, Line 55, delete "V" and insert --$\Psi$--.

In Column 15, Line 46, delete "KO" and insert --$K\beta$--.

Signed and Sealed this
Thirtieth Day of April, 2024

Katherine Kelly Vidal
*Director of the United States Patent and Trademark Office*